United States Patent
Miyoshi et al.

(10) Patent No.: US 10,906,592 B2
(45) Date of Patent: Feb. 2, 2021

(54) VEHICLE BODY STRUCTURE

(71) Applicant: MAZDA MOTOR CORPORATION, Hiroshima (JP)

(72) Inventors: Yuji Miyoshi, Higashi hiroshima (JP); Tomoya Yoshida, Hiroshima (JP); Junichi Tanaka, Hiroshima (JP); Masanobu Kobashi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 139 days.

(21) Appl. No.: 16/199,072

(22) Filed: Nov. 23, 2018

(65) Prior Publication Data

US 2019/0168820 A1 Jun. 6, 2019

(30) Foreign Application Priority Data

Dec. 1, 2017 (JP) .................................. 2017-231440
Dec. 1, 2017 (JP) .................................. 2017-231486
Dec. 1, 2017 (JP) .................................. 2017-231589

(51) Int. Cl.
*B62D 25/20* (2006.01)
*B62D 27/02* (2006.01)
(Continued)

(52) U.S. Cl.
CPC ............... *B62D 25/20* (2013.01); *B32B 7/12* (2013.01); *B62D 27/026* (2013.01); *B62D 27/04* (2013.01); *B62D 29/048* (2013.01); *B32B 2250/02* (2013.01); *B32B 2405/00* (2013.01); *B32B 2605/08* (2013.01); *B60J 10/70* (2016.02)

(58) Field of Classification Search
CPC ............... B62D 25/20; B62D 25/2009; B62D 25/2018; B62D 25/2027; B62D 25/2045; B62D 27/026; B62D 27/04; B62D 29/048; B32B 7/12; B32B 2250/02; B32B 2250/03; B32B 2405/00; B32B 2605/08
See application file for complete search history.

(56) References Cited

U.S. PATENT DOCUMENTS

2002/0014008 A1* 2/2002 Sato ....................... B62D 65/02
29/897.2
2005/0285432 A1* 12/2005 Sugihara ............... B60R 13/083
296/193.07
(Continued)

FOREIGN PATENT DOCUMENTS

EP 1845013 A2 10/2007
JP 2005-170176 A 6/2005
(Continued)

*Primary Examiner* — Gregory A Blankenship
(74) *Attorney, Agent, or Firm* — Studebaker & Brackett PC

(57) ABSTRACT

A vehicle body structure satisfies at least one of the following (A), (B), and (C): (A) an adhesive amount per unit area of a first adhesive in a second adjacent part is smaller than an adhesive amount per unit area of the first adhesive in a first adjacent part; (B) an adhesive amount per unit area of a panel adhesive in a second panel adjacent part is smaller than an adhesive amount per unit area of the panel adhesive in a first panel adjacent part; and (C) an adhesive amount per unit area of a second adhesive in a stacking adjacent part is smaller than an adhesive amount per unit area of the second adhesive in a non-stacking adjacent part.

20 Claims, 29 Drawing Sheets

(51) Int. Cl.
    *B62D 27/04*     (2006.01)
    *B32B 7/12*     (2006.01)
    *B62D 29/04*     (2006.01)
    *B60J 10/70*     (2016.01)

(56) References Cited

U.S. PATENT DOCUMENTS

| | | | |
|---|---|---|---|
| 2006/0066138 A1* | 3/2006 | Okana | B62D 25/2018 296/204 |
| 2019/0061833 A1* | 2/2019 | Yoshida | B23K 11/11 |
| 2019/0168820 A1* | 6/2019 | Miyoshi | B62D 27/026 |
| 2019/0168825 A1* | 6/2019 | Miyoshi | B62D 27/04 |
| 2019/0359046 A1* | 11/2019 | Tsuyuzaki | B60K 1/04 |
| 2020/0189665 A1* | 6/2020 | Friedman | B60H 1/00564 |

FOREIGN PATENT DOCUMENTS

| | | |
|---|---|---|
| JP | 2009-061955 A | 3/2009 |
| JP | 2010-064504 A | 3/2010 |
| JP | 2014-151657 A | 8/2014 |
| JP | 2016-107807 A | 6/2016 |
| JP | 2016-159765 A | 9/2016 |

\* cited by examiner

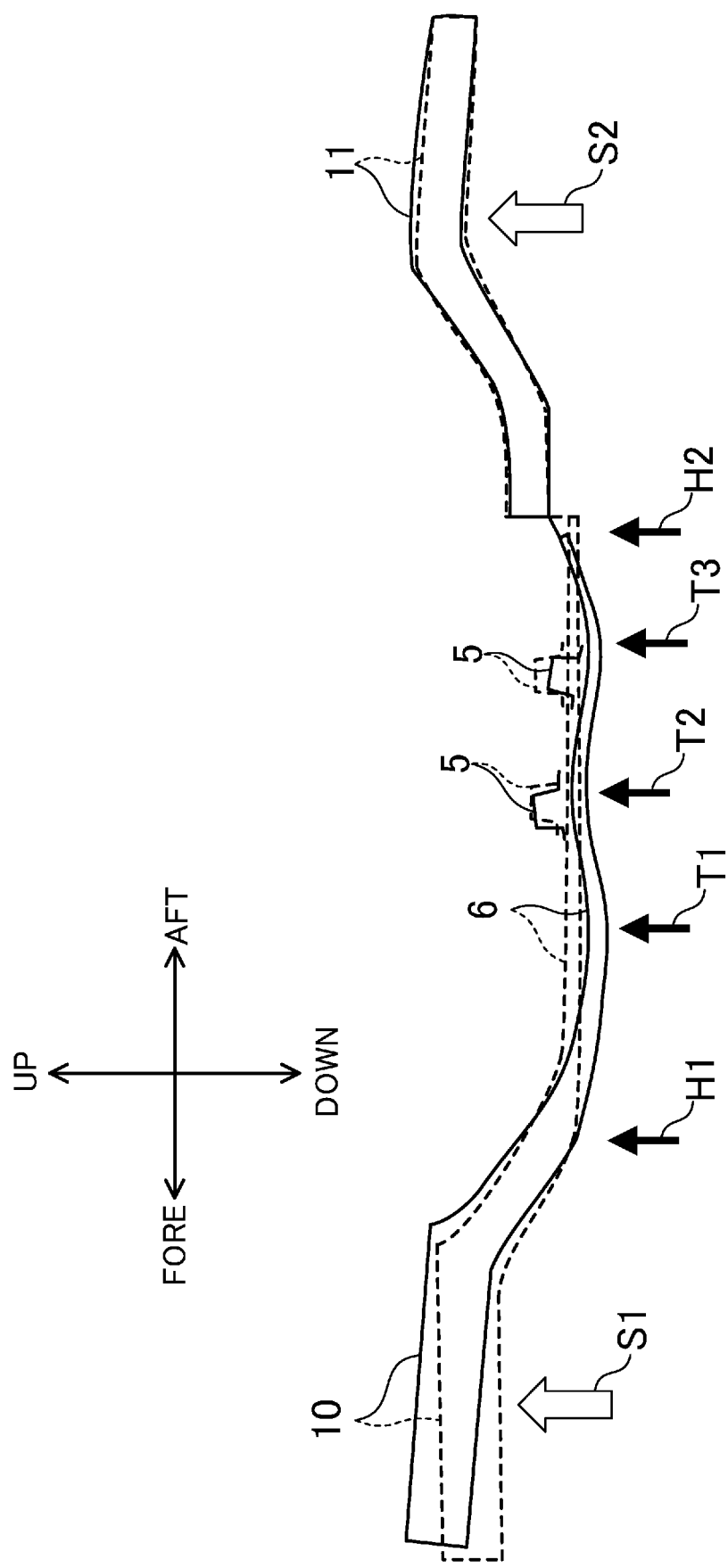

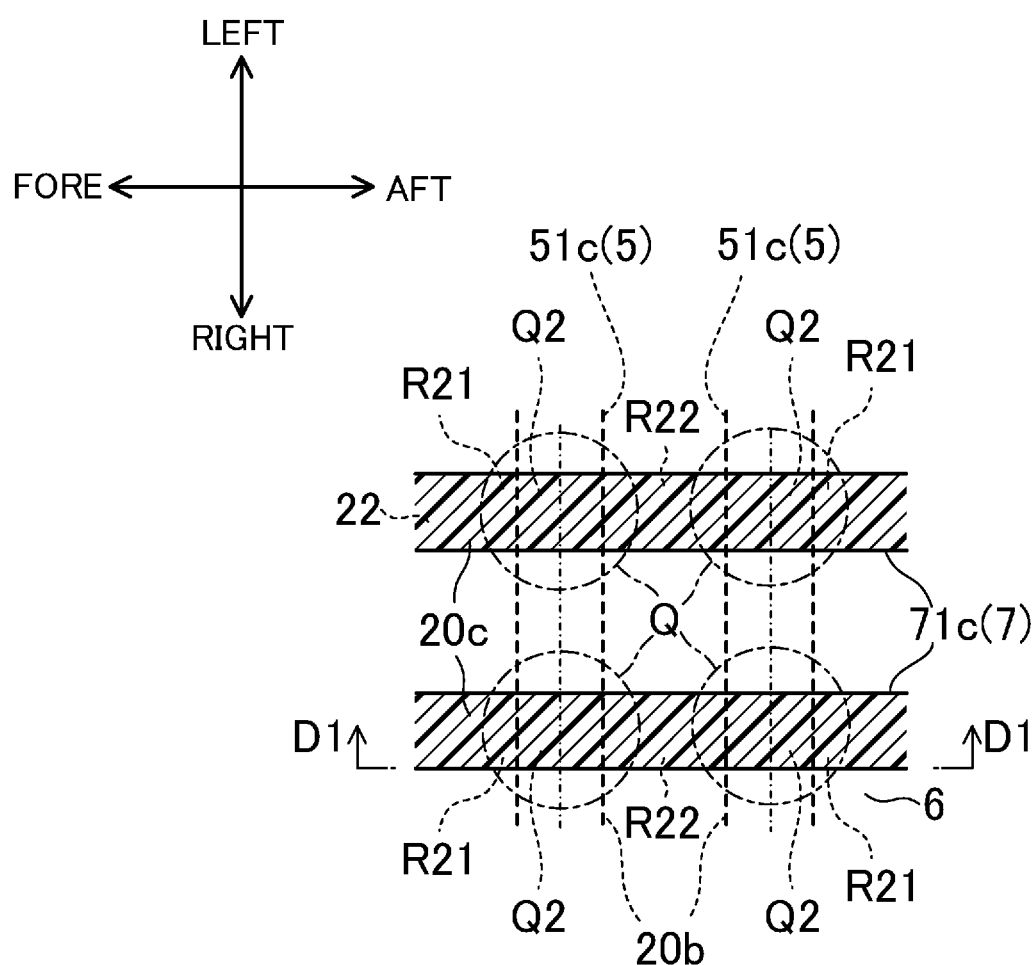

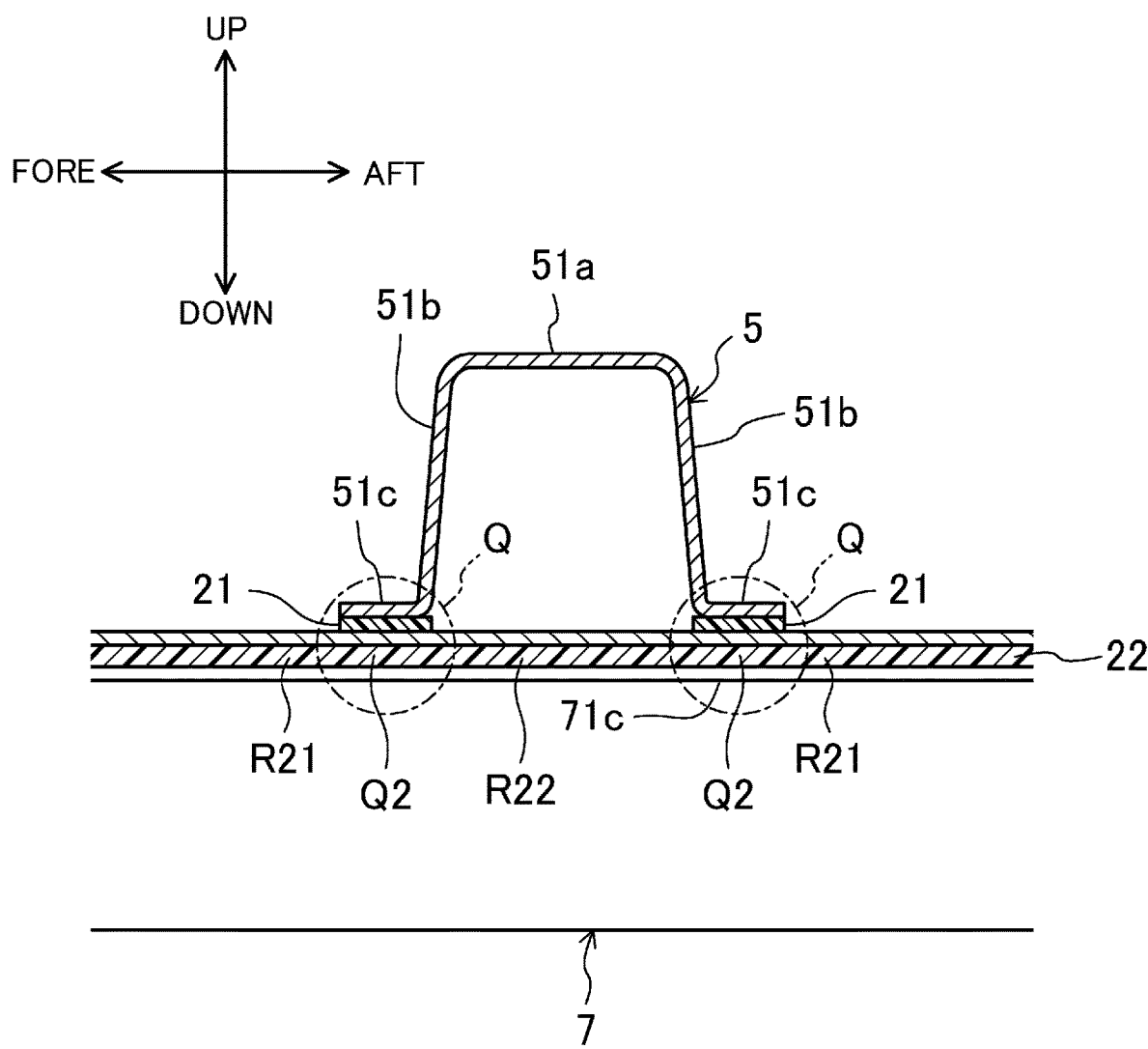

VEHICLE BODY STRUCTURE

CROSS-REFERENCE TO RELATED APPLICATION

This application claims priority to Japanese Patent Application No. 2017-231440, No. 2017-231486, and No. 2017-231589 filed on Dec. 1, 2017, the entire disclosure of which is incorporated by reference herein.

BACKGROUND

The present disclosure relates to a vehicle body structure.

Damping members have been conventionally employed for joining parts of members included in a vehicle body to substantially prevent vibration transmission and to substantially prevent fluctuations of body forming members.

Disclosed is a technique that in a fore body structure of a vehicle including a windshield panel and a cowl panel supporting the windshield panel from below, provides a damping member in a joining part between the windshield panel and the cowl panel to substantially prevent fluctuations of the windshield panel, for example (refer to Japanese Unexamined Patent Publication No. 2014-151657).

SUMMARY

Incidentally, there is a problem in that when an adhesive is uniformly placed in such a joining part, a part in which a plurality of members overlap with each other extremely increases in rigidity, and vibration damping performance in a specific frequency band conversely becomes worse than a case in which no adhesive is used.

It is an object of the present disclosure to provide a vehicle body structure that can substantially prevent an extreme increase in rigidity to achieve both appropriate rigidity and high damping performance.

To achieve the above object, the present disclosure reduces an adhesive amount of a damping adhesive in a part in which a plurality of members overlap with each other compared with an adhesive amount in other parts.

Specifically, a vehicle body structure disclosed herein is a vehicle body structure including a panel member forming a body, a first rigid member joined to one face of the panel member via a first joining part and/or an additional panel member joined to the one face of the panel member via a panel joining part, and a second rigid member joined to another face of the panel member via a second joining part, in which the first joining part includes a first adhesive, with damping performance, that adheres to, and joins together, both the first rigid member and the panel member, the panel joining part includes a panel adhesive, with damping performance, that adheres to, and joins together, both the panel member and the additional panel member, the second joining part includes a second adhesive, with damping performance, that adheres to, and joins together, both the second rigid member and the panel member, the first joining part includes a crossing part that overlaps with the second joining part and an adjacent part that is adjacent to the crossing part and does not overlap with the second joining part, the adjacent part includes a first adjacent part in which the second rigid member is not placed on the other face side of the panel member and a second adjacent part in which the second rigid member is placed, the panel joining part includes a panel crossing part that overlaps with the second joining part and a panel adjacent part that is adjacent to the panel crossing part and does not overlap with the second joining part, the panel adjacent part includes a first panel adjacent part in which the second rigid member is not placed on the other face side of the panel member and a second panel adjacent part in which the second rigid member is placed, the second joining part includes a second joining part crossing part that overlaps with the first joining part and a second joining part adjacent part that is adjacent to the second joining part crossing part and does not overlap with the first joining part, the second joining part adjacent part includes a non-stacking adjacent part in which the first rigid member is not placed on the one face side of the panel member and a stacking adjacent part in which the first rigid member is placed, and at least one of the following (A), (B), and (C) is satisfied:

(A) an adhesive amount per unit area of the first adhesive in the second adjacent part is smaller than an adhesive amount per unit area of the first adhesive in the first adjacent part;

(B) an adhesive amount per unit area of the panel adhesive in the second panel adjacent part is smaller than an adhesive amount per unit area of the panel adhesive in the first panel adjacent part; and (C) an adhesive amount per unit area of the second adhesive in the stacking adjacent part is smaller than an adhesive amount per unit area of the second adhesive in the non-stacking adjacent part.

A vehicle body structure disclosed herein includes a panel member forming a body, a first rigid member joined to one face of the panel member via a first joining part, and a second rigid member joined to another face of the panel member via a second joining part, in which the first joining part includes a first adhesive, with damping performance, that adheres to, and joins together, both the first rigid member and the panel member, the second joining part includes a second adhesive, with damping performance, that adheres to, and joins together, both the second rigid member and the panel member, the first joining part includes a crossing part that overlaps with the second joining part and an adjacent part that is adjacent to the crossing part and does not overlap with the second joining part, the adjacent part includes a first adjacent part in which the second rigid member is not placed on the other face side of the panel member and a second adjacent part in which the second rigid member is placed, and an adhesive amount per unit area of the first adhesive in the second adjacent part is smaller than an adhesive amount per unit area of the first adhesive in the first adjacent part.

A part in which a plurality of members overlap with each other extremely increases in rigidity when these members are all joined together using an adhesive, and even when a damping adhesive is used, vibration transmission to the panel member can be conversely facilitated, and vibration damping performance in a specific frequency band can be reduced. The present configuration can substantially prevent an extreme increase in rigidity in the second adjacent part, substantially prevent rigidity fluctuations along the first rigid member or the second rigid member, and maintain its continuity. This can substantially prevent the reduction in vibration damping performance in the specific frequency band and substantially prevent vibration transmission from the first rigid member and the second rigid member to the panel member.

In one preferred embodiment, the first adhesive and the second adhesive have characteristics with a storage elastic modulus of within a range of 100 MPa to 800 MPa and a loss factor of 0.2 or more under conditions with a temperature of 20° C. and an exciting force frequency of 60 Hz.

The present configuration uses an adhesive having the specific properties as the first adhesive and the second adhesive and can thereby achieve both high rigidity and high damping performance and easily achieve improvement in riding characteristics and noise reduction.

Further, in one preferred embodiment, the first adhesive and the second adhesive have characteristics with a storage elastic modulus of within a range of more than 500 MPa and 600 MPa or less and a loss factor of 0.3 or more under conditions with a temperature of 20° C. and an exciting force frequency of 60 Hz.

The present configuration can significantly increase the loss factor while ensuring high rigidity and can thus further achieve both high rigidity and high damping performance.

In one preferred embodiment, the first rigid member is a long member, the first joining part is formed so as to extend in a longitudinal direction of the first rigid member, and the first adhesive is placed continuously along an extension direction of the first joining part in parts other than the second adjacent part.

The present configuration can uniformly exert adhesiveness across a wide range of the first joining part even with the first joining part small in width. Consequently, even when an external force is locally exerted on the first joining part, the external force can be smoothly dispersed across the entire joining part, and the rigidity of the body can be increased.

In one preferred aspect, an adhesive amount per unit area of the first adhesive in the crossing part is smaller than an adhesive amount per unit area of the first adhesive in the first adjacent part.

A crossing part in which a plurality of members overlap with each other extremely increases in rigidity when these members are all joined together using a damping adhesive, vibration transmission to the panel member can be conversely facilitated, and vibration damping performance in a specific frequency band can be reduced. The present configuration can substantially prevent an extreme increase in rigidity in the crossing part, substantially prevent rigidity fluctuations along the first rigid member or the second rigid member, and maintain its continuity. This can substantially prevent the reduction in vibration damping performance in the specific frequency band and substantially prevent vibration transmission from the first rigid member and the second rigid member to the panel member.

In this case, in one preferred embodiment, the first adhesive is placed continuously along an extension direction of the first joining part in parts other than the crossing part and the second adjacent part.

The present configuration can uniformly exert adhesiveness across a wide range of the first joining part even with the first joining part small in width, can smoothly disperse the external force exerted on the first joining part across the entire joining part, and can thus increase the rigidity of the body.

The second rigid member is a long member, the second joining part is formed so as to extend in a longitudinal direction of the second rigid member, and the second adhesive is placed continuously along an extension direction of the second joining part.

The present configuration can uniformly exert adhesiveness across a wide range of the second joining part even with the second joining part small in width similarly to the first joining part, can, even when an external force is locally exerted, disperse it across the entire second joining part, and can thus increase the rigidity of the body.

In one preferred embodiment, the first joining part and/or the second joining part each include a pair of facing joining parts arranged so as to face each other with a certain spacing therebetween, and a closed section structure is formed between the pair of facing joining parts.

The present configuration forms the closed section structure between the pair of facing joining parts and can thus increase the rigidity of the body structure.

In one preferred embodiment, the first adhesive and/or the second adhesive are provided along edge parts of the facing joining parts facing the inside of the closed section structure.

The present configuration can substantially prevent the facing joining parts from opening and deformation from progressing when an external force such as a torsional force is exerted on the closed section structure and can thus increase rigidity also structurally.

In particular, in one preferred aspect, the first rigid member and/or the second rigid member are each a long member with a hat-shaped cross section, the first rigid member and/or the second rigid member each include a pair of flange parts provided substantially in parallel with each other so as to extend in their longitudinal directions at both ends in a width direction of the first rigid member and/or the second rigid member, the pair of facing joining parts are joined to the panel member via the pair of flange parts, and a closed section structure including the first rigid member and/or the second rigid member and the panel member is formed between the pair of facing joining parts.

The present configuration forms the closed section structure by the first rigid member and/or the second rigid member and the panel member and can thereby increase the rigidity of the body structure.

In one preferred embodiment, the panel member is a floor panel forming a vehicle cabin of the body, the first rigid member is at least one cross member for reinforcing the floor panel, and the second rigid member is a frame of the body.

The present configuration can bring about joining parts with high rigidity and high damping performance in the body structure forming the lower part of the vehicle cabin of the body and can thus improve comfort while ensuring body strength.

The frame is formed so as to extend in a vehicle fore-and-aft direction on the downside of the floor panel, the at least one cross member is formed so as to cross the frame and extend in a vehicle width direction on the upside of the floor panel and includes a plurality of cross members provided spaced apart from each other in the vehicle fore-and-aft direction, and an adhesive amount per unit area of the first adhesive in the crossing part positioned on both end sides in the vehicle fore-and-aft direction of the floor panel is smaller than an adhesive amount per unit area of the first adhesive in the crossing part positioned around the center in the vehicle fore-and-aft direction of the floor panel.

The front side and the rear side of the floor panel can be input sources of vibration transmitted from an engine and wheels to the floor panel via the front panel, the rear panel, and the frame. This can make it difficult to ensure damping performance when the joining parts on the front side and the rear side are extremely high in rigidity. The present configuration makes the adhesive amount of the first adhesive in the crossing part positioned on the front side and rear side of the floor panel than the adhesive amount of the first adhesive in the crossing part positioned around the center of the front panel and can thereby effectively substantially prevent vibration transmission and improve comfort while ensuring body strength.

In one preferred aspect, the frame is formed so as to extend in a vehicle fore-and-aft direction on the downside of the floor panel, the at least one cross member is formed so as to cross the frame and extend in the vehicle width direction on the upside of the floor panel and includes a plurality of cross members provided spaced apart from each other in the vehicle fore-and-aft direction, and, when an external force is exerted on the floor panel from a fore side and/or an aft side, an adhesive amount per unit area of the first adhesive in the crossing part close to a position of an amplitude loop of vibration in the vehicle fore-and-aft direction transmitted to the floor panel is smaller than an adhesive amount per unit area of the first adhesive in the crossing part far from the position of the amplitude loop.

Amplitude is maximized at the amplitude loop of vibration, and particularly preferably, vibration transmission in the crossing part close to the position of the amplitude loop is substantially prevented. The present configuration makes the adhesive amount per unit area of the first adhesive smaller in the crossing part closer to the position of the amplitude loop and can thereby effectively substantially prevent vibration transmission.

The first joining part and/or the second joining part may each be a structure with a combined use with spot welding and/or a mechanical jointer.

The first joining part and/or the second joining part are each a structure with a combined use of an adhesive and spot welding (weld bond joining), a structure with a combined use of an adhesive and a mechanical jointer, or an appropriate combination of these structures with a combined use of them, thereby enabling further achievement of both high rigidity and high damping performance.

In this case, in one preferred embodiment, the first rigid member and/or the second rigid member are each a long member, and the first joining part and/or the second joining part each include a plurality of spot joining parts that are arranged spaced apart from each other in an extension direction of the first rigid member and/or the second rigid member and are formed by causing both the first rigid member and/or the second rigid member and the panel member to be partially welded to each other in addition to joining with the first adhesive and/or the second adhesive.

The present configuration employs weld bond joining including the spot joining parts arranged spaced apart from each other in the extension direction of the first rigid member and/or the second rigid member in the first joining part and/or the second joining part and can thereby significantly increase the loss factor while ensuring high rigidity and easily achieve improvement in riding characteristics and noise reduction.

In one preferred embodiment, a spacing between the spot joining parts is set to be within a range of 10 mm to 100 mm.

When the spacing between the spot joining parts is extremely small, the influence of rigidity by joining increases, and a vibration damping effect of an adhering part is hindered. When the spacing between the spot joining parts is extremely large, the influence of rigidity by joining reduces, a burden on the adhering part increases, and rigidity as the entire joining part may reduce. The present configuration sets the spacing between the spot joining parts to the range described above, whereby the adhering part having rigidity and damping performance and the spot joining parts excellent in rigidity moderately complement each other, and both the high rigidity and high damping performance of the body can be stably achieved.

In one preferred embodiment, at least either the panel member or the first rigid member in the first joining part and/or at least either the panel member or the second rigid member in the second joining part have a thickness of less than 2 mm.

Along with the rigidity of the adhesive, the joining part of the member thinner than 2 mm appropriately bends, and along therewith a load such as shear is input to the adhesive placed in the joining part, and the adhesive changes its shape, whereby a damping performance improvement effect can be obtained while achieving weight reduction.

In one preferred aspect, the body further includes an additional panel member joined to a position that is an end part on the one face of the panel member and in which the first joining part is not formed via a panel joining part, in which the panel joining part includes a panel adhesive, with damping performance, that adheres to, and joins together, both the panel member and the additional panel member, the panel joining part includes a panel crossing part that overlaps with the second joining part and a panel adjacent part that is adjacent to the panel crossing part and does not overlap with the second joining part, the panel adjacent part includes a first panel adjacent part in which the second rigid member is not placed on the other face side of the panel member and a second panel adjacent part in which the second rigid member is placed, and an adhesive amount per unit area of the first adhesive in the second adjacent part is smaller than an adhesive amount per unit area of the first adhesive in the first adjacent part.

A joining part between the panel member and the additional panel member, that is, a part in which the second joining part overlaps with the panel joining part also tends to be extremely high in rigidity. The present configuration can achieve both high rigidity and high damping performance also in the panel joining part and improve comfort while ensuring body strength.

In this case, an adhesive amount per unit area of the panel adhesive in the panel crossing part may be smaller than an adhesive amount per unit area of the panel adhesive in the first panel adjacent part.

The present configuration can further achieve both high rigidity and high damping performance and improve comfort while ensuring body strength.

In one preferred embodiment, the panel member is a floor panel forming a vehicle cabin of the body, the additional panel member is a front panel placed in a fore-and-lower part of the body and/or a rear panel placed in an aft-and-lower part of the body, and the second rigid member is a frame placed so as to extend to the front panel and/or the rear panel in the vehicle fore-and-aft direction on the downside of the floor panel.

Joining parts between the front panel and the rear panel and the floor panel, that is, the panel joining part can be input sources of vibration to the floor panel when vibration has transmitted from the front panel and the rear panel and the fore side or aft side of the frame. The present configuration substantially prevents an extreme increase in rigidity in the crossing part between the panel joining part and the second joining part and can thereby effectively substantially prevent vibration transmission and improve comfort while ensuring body strength.

Specifically, a vehicle body structure disclosed herein includes a panel member forming a body, an additional panel member joined to one face of the panel member via a panel joining part, and a second rigid member joined to another face of the panel member via a second joining part, in which the panel joining part includes a panel adhesive, with damping performance, that adheres to, and joins together, both the panel member and the additional panel member, the second joining part includes a second adhesive, with damping performance, that adheres to, and joins together, both the second rigid member and the panel member, the panel joining part includes a panel crossing part that overlaps with the second joining part and a panel adjacent part that is adjacent to the panel crossing part and does not overlap with the second joining part, the panel adjacent part includes a first panel adjacent part in which the second rigid member is not placed on the other face side of the panel member and a second panel adjacent part in which the second rigid member is placed, and an adhesive amount per unit area of the panel adhesive in the second panel adjacent part is smaller than an adhesive amount per unit area of the panel adhesive in the first panel adjacent part.

A part in which a plurality of members overlap with each other extremely increases in rigidity when these members are all joined together using an adhesive, and even when a damping adhesive is used, vibration transmission to the panel member can be conversely facilitated, and vibration damping performance in a specific frequency band can be reduced. The present configuration can substantially prevent an extreme increase in rigidity in the second panel adjacent part, substantially prevent rigidity fluctuations along the second rigid member, and maintain its continuity. This can substantially prevent the reduction in vibration damping performance in the specific frequency band and substantially prevent vibration transmission from the second rigid member to the panel member.

In one preferred embodiment, the panel adhesive and the second adhesive have characteristics with a storage elastic modulus of within a range of 100 MPa to 800 MPa and a loss factor of 0.2 or more under conditions with a temperature of 20° C. and an exciting force frequency of 60 Hz.

The present configuration uses an adhesive having the specific properties as the panel adhesive and the second adhesive and can thereby achieve both high rigidity and high damping performance and easily achieve improvement in riding characteristics and noise reduction.

In one preferred embodiment, the panel adhesive and the second adhesive have characteristics with a storage elastic modulus of within a range of more than 500 MPa and 600 MPa or less and a loss factor of 0.3 or more under conditions with a temperature of 20° C. and an exciting force frequency of 60 Hz.

The present configuration can significantly increase the loss factor while ensuring high rigidity and can thus further achieve both high rigidity and high damping performance.

In one preferred aspect, the panel member and the additional panel member are joined to each other at respective end parts thereof. The panel joining part is formed so as to extend along the end part of the panel member and the end part of the additional panel member. The panel adhesive is placed continuously along an extension direction of the panel joining part in parts other than the second panel adjacent part.

The present configuration can uniformly exert adhesiveness across a wide range of the panel joining part even with the panel joining part small in width. Consequently, even when an external force is locally exerted on the panel joining part, the external force can be smoothly dispersed across the entire joining part, and the rigidity of the body can be increased.

In one preferred aspect, an adhesive amount per unit area of the panel adhesive in the panel crossing part is smaller than an adhesive amount per unit area of the panel adhesive in the first panel adjacent part.

A crossing part in which a plurality of members overlap with each other extremely increases in rigidity when these members are all joined together using a damping adhesive, vibration transmission to the panel member can be conversely facilitated, and vibration damping performance in a specific frequency band can be reduced. The present configuration can substantially prevent an extreme increase in rigidity in the panel crossing part, substantially prevent rigidity fluctuations along the second rigid member, and maintain its continuity. This can substantially prevent the reduction in vibration damping performance in the specific frequency band and substantially prevent vibration transmission from the second rigid member to the panel member.

In this case, in one preferred embodiment, the panel adhesive is placed continuously along the extension direction of the panel joining part in parts other than the panel crossing part and the second panel adjacent part.

The present configuration can uniformly exert adhesiveness across a wide range of the panel joining part even with the panel joining part small in width, can smoothly disperse the external force exerted on the panel joining part across the entire joining part, and can thus increase the rigidity of the body.

In one preferred aspect, the second rigid member is a long member, the second joining part is formed so as to extend in the longitudinal direction of the second rigid member, and the second adhesive is placed continuously along the extension direction of the second joining part.

The present configuration can uniformly exert adhesiveness across a wide range of the second joining part even with the second joining part small in width similarly to the panel joining part, can, even when an external force is locally exerted, disperse it across the entire second joining part, and can thus increase the rigidity of the body.

In one preferred embodiment, the second joining part includes a pair of facing joining parts arranged so as to face each other with a certain spacing therebetween, and a closed section structure is formed between the pair of facing joining parts.

The present configuration forms the closed section structure between the pair of facing joining parts and can thereby increase the rigidity of the body structure.

In one preferred embodiment, the second adhesive is provided along edge parts of the facing joining parts facing the inside of the closed section structure.

The present configuration can substantially prevent the facing joining parts from opening and deformation from progressing when an external force such as a torsional force is exerted on the closed section structure and can thus increase rigidity also structurally.

In one preferred aspect, the second rigid member is a long member with a hat-shaped cross section, the second rigid member includes a pair of flange parts provided substantially in parallel with each other so as to extend in their longitudinal directions at both ends in a width direction of the second rigid member, the pair of facing joining parts are joined to the panel member via the pair of flange parts, and a closed section structure including the second rigid member and the panel member is formed between the pair of facing joining parts.

The present configuration forms the closed section structure by the second rigid member and the panel member and can thereby increase the rigidity of the body structure.

In one preferred aspect, the panel member is a floor panel forming a vehicle cabin of the body, the additional panel member is a front panel and/or a rear panel of the body, and the second rigid member is a frame of the body.

The present configuration can bring about joining parts with high rigidity and high damping performance in the body structure forming the lower part of the vehicle cabin of the body and can thus improve comfort while ensuring body strength.

In this case, in one preferred embodiment, the panel joining part is formed so as to extend in the vehicle width direction, and the frame is joined to the floor panel to extend in the vehicle fore-and-aft direction and is joined to the front panel and/or the rear panel on the fore side or the aft side of the panel joining part.

The panel joining part positioned on the front side and the rear side of the front panel can be input sources of vibration transmitted from an engine and wheels to the floor panel via the front panel, the rear panel, and the frame. Ensuring damping performance in the panel joining part is effective in substantially preventing vibration transmission. The present configuration can effectively substantially prevent vibration transmission in the entrances of vibration to the floor panel and improve comfort while ensuring body strength.

In one preferred aspect, the panel joining part and/or the second joining part may each be a structure with a combined use with spot welding and/or a mechanical jointer.

The first joining part and/or the second joining part are each a structure with a combined use of an adhesive and spot welding (weld bond joining), a structure with a combined use of an adhesive and a mechanical jointer, or an appropriate combination of these structures with a combined use of them, thereby enabling further achievement of both high rigidity and high damping performance.

In one preferred aspect, the panel joining part is formed so as to extend in the vehicle width direction, the second rigid member is a long member, and the panel joining part and/or the second joining part each include a plurality of spot joining parts that are arranged spaced apart from each other in an extension direction of the panel joining part and/or the second rigid member and are formed by causing both the additional panel member and/or the second rigid member and the panel member to be partially welded to each other in addition to joining with the panel adhesive and/or the second adhesive.

The present configuration employs weld bond joining including the spot joining parts arranged spaced apart from each other in the extension direction of the panel joining part and/or the second rigid member in the panel joining part and/or the second joining part and can thereby significantly increase the loss factor while ensuring high rigidity and easily achieve improvement in riding characteristics and noise reduction.

In this case, in one preferred embodiment, a spacing between the spot joining parts is set to be within a range of 10 mm to 100 mm.

When the spacing between the spot joining parts is extremely small, the influence of rigidity by joining increases, and a vibration damping effect of an adhering part is hindered. When the spacing between the spot joining parts is extremely large, the influence of rigidity by joining reduces, a burden on the adhering part increases, and rigidity as the entire joining part may reduce. The present configuration sets the spacing between the spot joining parts to the range described above, whereby the adhering part having rigidity and damping performance and the spot joining parts excellent in rigidity moderately complement each other, and both the high rigidity and high damping performance of the body can be stably achieved.

In one preferred embodiment, at least either the panel member or the additional panel member in the panel joining part and/or at least either the panel member or the second rigid member in the second joining part have a thickness of less than 2 mm.

Along with the rigidity of the adhesive, the joining part of the member thinner than 2 mm appropriately bends, and along therewith a load such as shear is input to the adhesive placed in the joining part, and the adhesive changes its shape, whereby a damping performance improvement effect can be obtained while achieving weight reduction.

In one preferred aspect, the body further includes a first rigid member joined to a position that is on the one face of the panel member and in which the panel joining part is not formed via a first joining part, in which the first joining part includes a first adhesive, with damping performance, that adheres to, and joins together, both the first rigid member and the panel member, the first joining part includes a crossing part that overlaps with the second joining part and an adjacent part that is adjacent to the crossing part and does not overlap with the second joining part, the adjacent part includes a first adjacent part in which the second rigid member is not placed on the other face side of the panel member and a second adjacent part in which the second rigid member is placed, and an adhesive amount per unit area of the first adhesive in the second adjacent part is smaller than an adhesive amount per unit area of the first adhesive in the first adjacent part.

A joining part between the panel member and the first rigid member, that is, a part in which the second joining part overlaps with the first joining part also tends to be extremely high in rigidity. The present configuration can achieve both high rigidity and high damping performance also in the first joining part and improve comfort while ensuring body strength.

In this case, an adhesive amount per unit area of the first adhesive in the crossing part may be smaller than an adhesive amount per unit area of the first adhesive in the first adjacent part.

The present configuration can further achieve both high rigidity and high damping performance and improve comfort while ensuring body strength.

In one preferred embodiment, the panel member is a floor panel forming a vehicle cabin of the body, the first rigid member is a cross member joined to an upper face of the floor panel so as to extend in the vehicle width direction for reinforcing the floor panel, and the second rigid member is a frame joined to a lower face of the floor panel so as to extend in the vehicle fore-and-aft direction.

The present configuration substantially prevents an extreme increase in rigidity in the crossing part between the first joining part and the second joining part and can thereby effectively substantially prevent vibration transmission and improve comfort while ensuring body strength.

Specifically, a vehicle body structure disclosed herein includes a panel member forming a body, a first rigid member joined to one face of the panel member via a first joining part, and a second rigid member joined to another face of the panel member via a second joining part, in which the second joining part includes a damping adhesive that adheres to, and joins together, both the second rigid member and the panel member, the second joining part includes a second joining part crossing part that overlaps with the first joining part and a second joining part adjacent part that is adjacent to the second joining part crossing part and does not overlap with the first joining part, the second joining part adjacent part includes a non-stacking adjacent part in which the first rigid member is not placed on the one face side of the panel member and a stacking adjacent part in which the first rigid member is placed, and an adhesive amount per unit area of the adhesive in the stacking adjacent part is smaller than an adhesive amount per unit area of the adhesive in the non-stacking adjacent part.

A part in which a plurality of members overlap with each other extremely increases in rigidity when these members are all joined together using an adhesive, and even when a damping adhesive is used, vibration transmission to the panel member can be conversely facilitated, and vibration damping performance in a specific frequency band can be reduced. The present configuration can substantially prevent an extreme increase in rigidity in the stacking adjacent part and substantially prevent the reduction in vibration damping performance in the specific frequency band in the stacking adjacent part. This can substantially prevent vibration transmission from the second rigid member to the panel member and the first rigid member.

In one preferred embodiment, the second rigid member is a long member, the second joining part is formed so as to extend in the longitudinal direction of the second rigid member, and the adhesive is placed continuously along the extension direction of the second joining part in parts other than the second joining part crossing part.

The present configuration can uniformly exert adhesiveness across a wide range of the second joining part even with the second joining part small in width, can, even when an external force is locally exerted, disperse it across the entire second joining part, and can thus increase the rigidity of the body.

In one preferred embodiment, an adhesive amount per unit area of the adhesive in the second joining part crossing part is smaller than an adhesive amount per unit area of the adhesive in the non-stacking adjacent part.

A part in which a plurality of joining parts overlap with each other also extremely increases in rigidity when these members are all joined together using an adhesive, and even when a damping adhesive is used, vibration transmission to the panel member can be conversely facilitated, and vibration damping performance in a specific frequency band can be reduced. The present configuration can substantially prevent an extreme increase in rigidity in the second joining part crossing part and thus substantially prevent vibration transmission from the second rigid member to the panel member.

In one preferred embodiment, the second rigid member is a long member, the second joining part is formed so as to extend in the longitudinal direction of the second rigid member, and the adhesive is placed continuously along the extension direction of the first joining part in parts other than the second joining part crossing part and the stacking adjacent part.

The present configuration can uniformly exert adhesiveness across a wide range of the second joining part even with the second joining part small in width, can, even when an external force is locally exerted, disperse it across the entire second joining part, and can thus increase the rigidity of the body.

In one preferred embodiment, the first joining part and/or the second joining part each include a pair of facing joining parts arranged so as to face each other with a certain spacing therebetween, and a closed section structure is formed between the pair of facing joining parts.

The present configuration forms the closed section structure between the pair of facing joining parts and can thereby increase the rigidity of the body structure.

In one preferred embodiment, the first rigid member and/or the second rigid member are each a long member with a hat-shaped cross section, the first rigid member and/or the second rigid member each include a pair of flange parts provided substantially in parallel with each other so as to extend in their longitudinal directions at both ends in the width direction of the first rigid member and/or the second rigid member, the pair of facing joining parts are joined to the panel member via the pair of flange parts, and a closed section structure including the first rigid member and/or the second rigid member and the panel member is formed between the pair of facing joining parts.

The present configuration forms the closed section structure by the first rigid member and/or the second rigid member and the panel member and can thereby increase the rigidity of the body structure.

In one preferred embodiment, in the second joining part, the adhesive is provided along edge parts of the facing joining parts facing the inside of the closed section structure.

The present configuration can substantially prevent the facing joining parts from opening and deformation from progressing when an external force such as a torsional force is exerted on the closed section structure and can thus increase rigidity also structurally.

In one preferred embodiment, the panel member is a floor panel forming a vehicle cabin of the body, the first rigid member is at least one cross member for reinforcing the floor panel, and the second rigid member is a frame of the body.

The present configuration can bring about joining parts with high rigidity and high damping performance in the body structure forming the lower part of the vehicle cabin of the body and can thus improve comfort while ensuring body strength.

In one preferred embodiment, the frame is formed so as to extend in the vehicle fore-and-aft direction on the downside of the floor panel, the at least one cross member is formed so as to cross the frame and extend in the vehicle width direction on the upside of the floor panel and includes a plurality of cross members provided spaced apart from each other in the vehicle fore-and-aft direction, and an adhesive amount per unit area of the adhesive in the stacking adjacent part positioned on both end sides in the vehicle fore-and-aft direction of the floor panel is smaller than an adhesive amount per unit area of the adhesive in the stacking adjacent part positioned around the center of the floor panel.

The front side and the rear side of the floor panel can be input sources of vibration transmitted from an engine and wheels to the floor panel via the front panel, the rear panel, and the frame. This can make it difficult to ensure damping performance when the joining parts on the front side and the rear side are extremely high in rigidity. The present configuration makes the adhesive amount of the adhesive in the stacking adjacent part positioned on the front side and the rear side of the front panel smaller than the adhesive amount of the adhesive in the stacking adjacent part positioned around the center of the front panel and can thereby effectively substantially prevent vibration transmission and improve comfort while ensuring body strength.

In one preferred embodiment, the frame is formed so as to extend in the vehicle fore-and-aft direction on the downside of the floor panel, the at least one cross member is formed so as to cross the frame and extend in the vehicle width direction on the upside of the floor panel and includes a plurality of cross members provided spaced apart from each other in the vehicle fore-and-aft direction, and, when an external force is exerted on the floor panel from the fore side and/or the aft side, an adhesive amount per unit area of the adhesive in the stacking adjacent part close to the position of the amplitude loop of vibration in the vehicle fore-and-aft direction transmitted to the floor panel is smaller than an adhesive amount per unit area of the adhesive in the stacking adjacent part far from the position of the amplitude loop.

Amplitude is maximized at the amplitude loop of vibration, and particularly preferably, vibration transmission in the stacking adjacent part close to the position of the amplitude loop is substantially prevented. The present configuration makes the adhesive amount per unit area of the adhesive smaller in the stacking adjacent part closer to the position of the amplitude loop and can thereby effectively substantially prevent vibration transmission.

In one preferred embodiment, the first joining part includes an additional damping adhesive that adheres to, and joins together, both the first rigid member and the panel member.

The present configuration can increase the joining strength of the first joining part and increase the rigidity of the body.

In one preferred embodiment, the first rigid member is a long member, the first joining part is formed so as to extend in the longitudinal direction of the first rigid member, and the additional adhesive is placed continuously along the extension direction of the first joining part.

The present configuration can uniformly exert adhesiveness across a wide range of the first joining part even with the first joining part small in width. Consequently, even when an external force is locally exerted on the first joining part, the external force can be smoothly dispersed across the entire joining part, and the rigidity of the body can be increased.

In one preferred embodiment, the adhesive has characteristics with a storage elastic modulus of within a range of 100 MPa to 800 MPa and a loss factor of 0.2 or more under conditions with a temperature of 20° C. and an exciting force frequency of 60 Hz.

The present configuration uses an adhesive having the specific properties and can thereby achieve both high rigidity and high damping performance and easily achieve improvement in riding characteristics and noise reduction.

In one preferred embodiment, the adhesive has characteristics with a storage elastic modulus of within a range of more than 500 MPa and 600 MPa or less and a loss factor of 0.3 or more under conditions with a temperature of 20° C. and an exciting force frequency of 60 Hz.

The present configuration can significantly increase the loss factor while ensuring high rigidity and can thus further achieve both high rigidity and high damping performance.

In one preferred embodiment, the first joining part includes an additional damping adhesive that adheres to, and joins together, both the first rigid member and the panel member, and the first joining part and/or the second joining part are each a structure with a combined use with spot welding and/or a mechanical jointer.

The first joining part and/or the second joining part are each a structure with a combined use of an adhesive and spot welding (weld bond joining), a structure with a combined use of an adhesive and a mechanical jointer, or an appropriate combination of these structures with a combined use of them, thereby enabling further achievement of both high rigidity and high damping performance.

In one preferred embodiment, the first rigid member and/or the second rigid member are each a long member, and the first joining part and/or the second joining part each include a plurality of spot joining parts that are arranged spaced apart from each other in an extension direction of the first rigid member and/or the second rigid member and are formed by causing both the first rigid member and/or the second rigid member and the panel member to be partially welded to each other in addition to joining with the adhesive and/or the additional adhesive.

The present configuration employs weld bond joining including the spot joining parts arranged spaced apart from each other in the extension direction of the first rigid member and/or the second rigid member in the first joining part and/or the second joining part and can thereby significantly increase the loss factor while ensuring high rigidity and easily achieve improvement in riding characteristics and noise reduction.

In one preferred embodiment, a spacing between the spot joining parts is set to be within a range of 10 mm to 100 mm.

When the spacing between the spot joining parts is extremely small, the influence of rigidity by joining increases, a vibration damping effect of an adhering part, which is a part in which the adhesive is present, is hindered. When the spacing between the spot joining parts is extremely large, the influence of rigidity by joining reduces, a burden on the adhering part increases, and rigidity as the entire joining part may reduce. The present configuration sets the spacing between the spot joining parts to the range described above, whereby the adhering part having rigidity and damping performance and the spot joining parts excellent in rigidity moderately complement each other, and both the high rigidity and high damping performance of the body can be stably achieved.

In one preferred embodiment, at least either the panel member or the first rigid member in the first joining part and/or at least either the panel member or the second rigid member in the second joining part have a thickness of less than 2 mm.

Along with the rigidity of the adhesive, the joining part of the member thinner than 2 mm appropriately bends, and along therewith a load such as shear is input to the adhesive placed in the joining part, and the adhesive changes its shape, whereby a damping performance improvement effect can be obtained while achieving weight reduction.

As described in the foregoing, the present disclosure can achieve both high rigidity and high damping performance in a vehicle body structure. Consequently, improvement in riding characteristics and noise reduction can be easily achieved to improve the comfort of the vehicle while ensuring necessary body strength.

BRIEF DESCRIPTION OF THE DRAWINGS

FIG. 8 is a side view schematically illustrating a state of vibration of a body structure of a vehicle lower part;

FIG. 28 is a diagram corresponding to FIG. 17 of a conventional body structure in which a second adhesive has been uniformly applied to the entire second joining part; and FIG. 29 is a sectional view along the D1-D1 line in FIG. 28.

DETAILED DESCRIPTION

The following describes embodiments of the present disclosure in detail on the basis of the accompanying drawings. The following descriptions of the preferred embodiments are substantially only by way of example and do not intend to limit the present disclosure, objects to which it is applied, or its use at all.

First Embodiment

Body Structure

Figure 1:
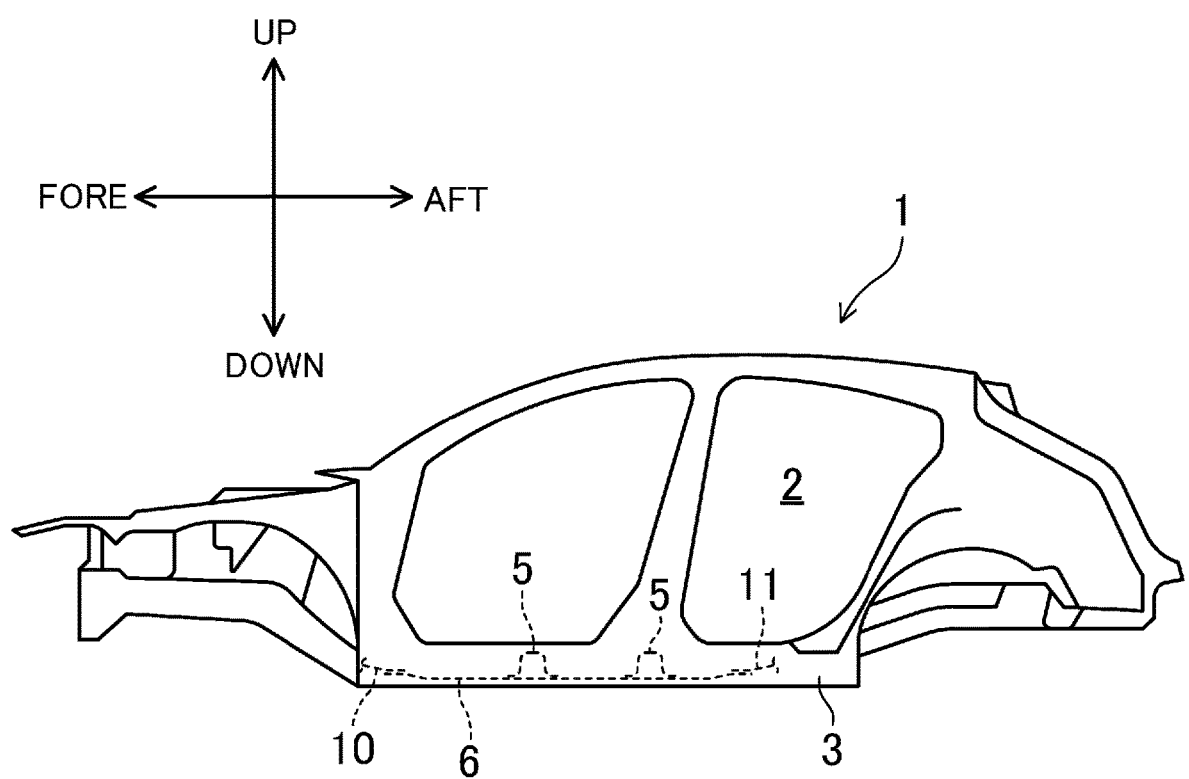
FIG. 1 is a schematic diagram when a body is viewed from a left side.
Figure 2:
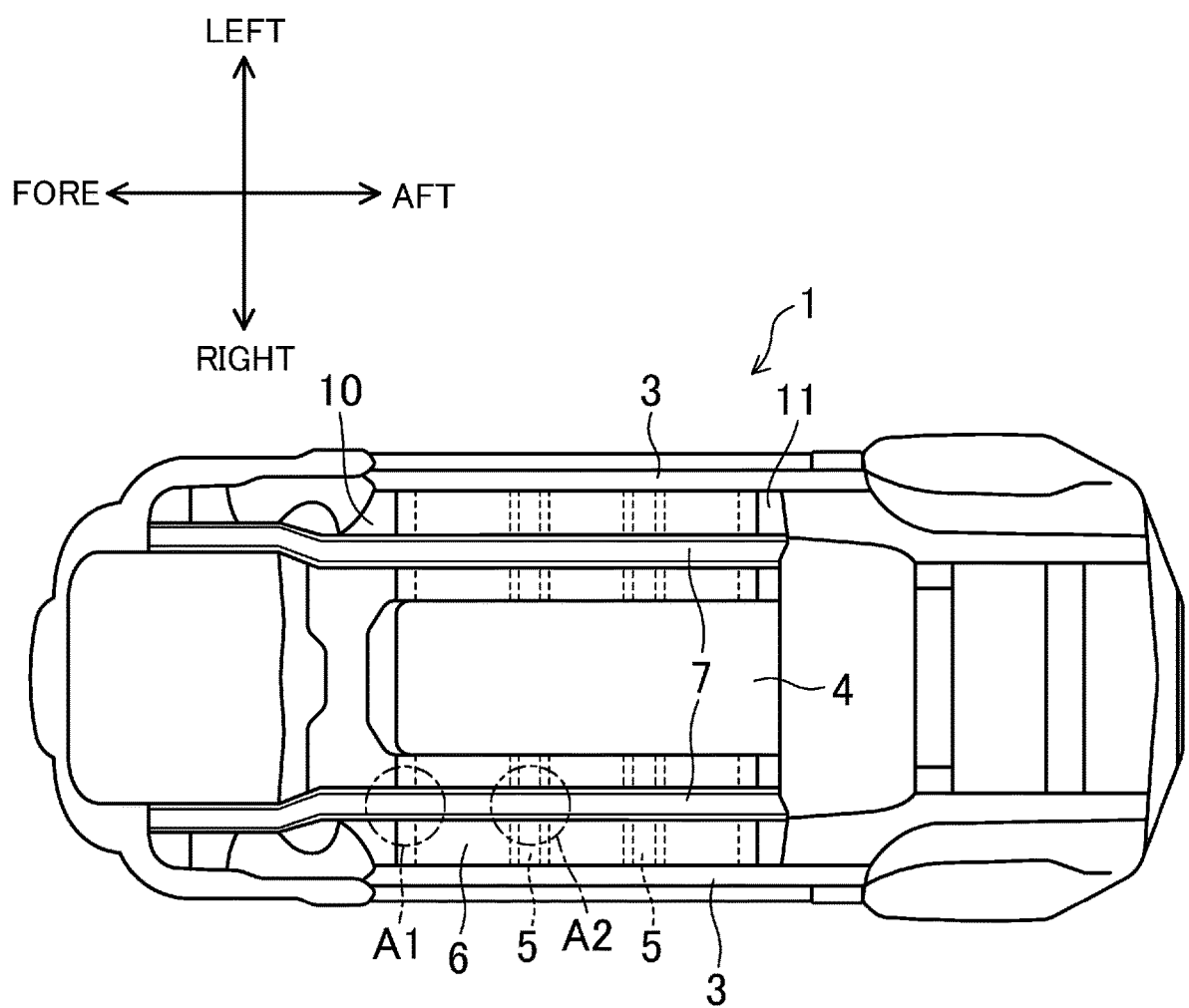
FIG. 2 is a schematic diagram when the body is viewed from below.

FIG. 1 and FIG. 2 illustrate a body 1 of an automobile (a vehicle) to which a vehicle body structure according to the disclosed technique is applied. FIG. 1 is a drawing when the body 1 is viewed from a left side, whereas FIG. 2 is a drawing when the body 1 is viewed from below.

In the present specification, directions are based on the body 1. In other words, as illustrated in FIG. 1, a "fore-and-aft direction" and an "up-and-down direction" are the same directions as a vehicle fore-and-aft direction and a vehicle up-and-down direction, respectively. A "fore side" may be referred to as a "front side," whereas an "aft side" may be referred to as a "rear side." As illustrated in FIG. 2, a "right-and-left direction" is the same direction as a vehicle width direction and is a direction that defines the near side of the drawing in FIG. 1 as a left side and defines the far side thereof as a right side.

A fore part of the body 1 mainly forms an engine room, whereas an aft part of the body 1 mainly forms a trunk. A vehicle cabin 2 housing passengers is formed by an intermediate part in the fore-and-aft direction of the body 1. Side sills 3 and 3 extending in parallel in the fore-and-aft direction are placed on the right and left of the intermediate part of a lower part of the body 1. A tunnel reinforcement 4 is placed so as to extend in the fore-and-aft direction in a central part in the vehicle width direction between the side sills 3 and 3.

A plurality of cross members 5 (first rigid members) extending in the vehicle width direction are joined to the right and left side sills 3 and 3 so as to cross this tunnel reinforcement 4. A floor panel 6 (a panel member) is placed so as to cover a floor of the vehicle cabin 2 on the downside of these cross members 5 in the intermediate part of the lower part of the body 1. The cross members 5 are joined to the floor panel 6 to have a role of reinforcing the floor panel 6.

A fore end part of the floor panel 6 is joined to a front panel 10 (an additional panel member) positioned in a fore-and-lower part of the body 1. An aft end part of the floor panel 6 is joined to a rear panel 11 (an additional panel member) positioned in an aft-and-lower part of the body 1. A pair of right and left frames 7 (second rigidity member) are joined to the downside of the floor panel 6 to extend in the vehicle fore-and-aft direction. The frames 7 are joined to the downside of the front panel 10 on the fore side of the fore end part of the floor panel 6 and are joined to the downside of the rear panel 11 on the aft side of the aft end part of the floor panel 6. The frames 7 are joined to the floor panel 6, the front panel 10, and the rear panel 11 to have a role of reinforcing these members.

The floor panel 6, the side sills 3, the tunnel reinforcement 4, the cross members 5, the frames 7, the front panel 10, and the rear panel 11 (hereinafter, these members may be collectively referred to as "body forming members") are joined to each other to form a body structure supporting a lower part of the vehicle cabin 2.

Joining Part

Mutual joining parts of the body forming members are each named a joining part 20. The joining part 20 includes a first joining part 20b, a second joining part 20c, and a panel joining part 20a as described below.

First Joining Part

Figure 3:
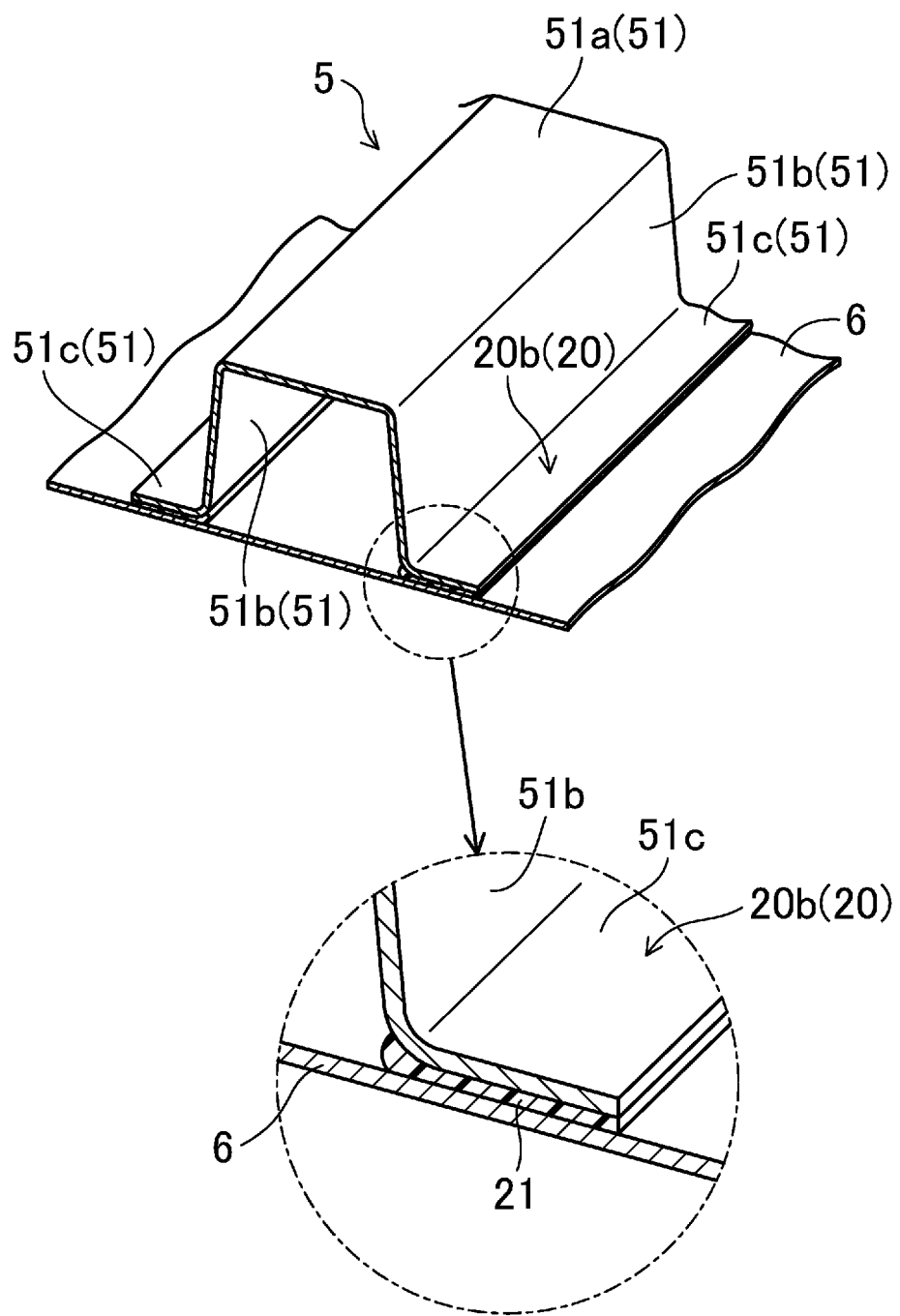
FIG. 3 is a schematic perspective view of a first joining part between a cross member and a floor panel.

FIG. 3 illustrates the first joining part 20b of the cross member 5 and the floor panel 6. The cross member 5 is formed by causing a cross member main body 51 as a long member with a hat-shaped cross section to be joined to an upper face (one face) of the floor panel 6 via the first joining part 20b. The cross member main body 51 has a strip-shaped main wall part 51a, a pair of side wall parts 51b and 51b extending on both side edges of the main wall part 51a across the entire length thereof while facing each other, and a pair of flange parts 51c and 51c projecting in mutually opposite directions from respective edges of the side wall parts 51b across the entire length thereof.

The flange parts 51c and 51c are provided substantially in parallel with each other so as to extend in their longitudinal directions at both ends in a width direction of the cross member main body 51 and are joined to the upper face of the floor panel 6 with a damping adhesive 21 with damping performance. In other words, the first joining part 20b includes the flange parts 51c and 51c, the floor panel 6, and the first adhesive 21 that adheres to, and joins together, both of them. The first joining part 20b thus forms a pair of facing joining parts extending in parallel with each other so as to face each other with a certain spacing therebetween. A closed section structure is formed by the main wall part 51a and the pair of side wall parts 51b and 51b of the cross member main body 51 and the floor panel 6 between the pair of facing joining parts. The closed section structure is formed, whereby the rigidity of the body 1 is structurally enhanced.

In the first joining part 20b formed so as to extend in the longitudinal direction of the cross member 5, the first adhesive 21 is placed continuously along an extension direction of the first joining part 20b in parts other than a second adjacent part R2 described below as illustrated in FIG. 3.

The flange parts 51c of the cross member main body 51 can be formed so as to extend long and thin with a small width. For this reason, in one preferred embodiment, to stably achieve both high rigidity and high damping performance, a uniform joined state is given across the entire first joining part 20b. Consequently, in the first joining part 20b, the first adhesive 21 is provided in a continuous manner without any substantial break in the extension direction of the first joining part 20b.

With this configuration, even when the width of the first joining part 20b is small, uniform adhesiveness can be ensured across a wide range of the first joining part 20b. Thus, even when an external force is locally exerted on the first joining part 20b, the external force can be smoothly dispersed across the entire first joining part 20b, and the rigidity of the body 1 can be increased.

As illustrated in FIG. 3, the first adhesive 21 may be provided along an edge part facing the inside of the closed section structure of the first joining part 20b. This can substantially prevent the first joining part 20b from opening and deformation from progressing when an external force such as a torsional force is exerted on the closed section structure and can thus increase rigidity also structurally.

Second Joining Part

Figure 4:
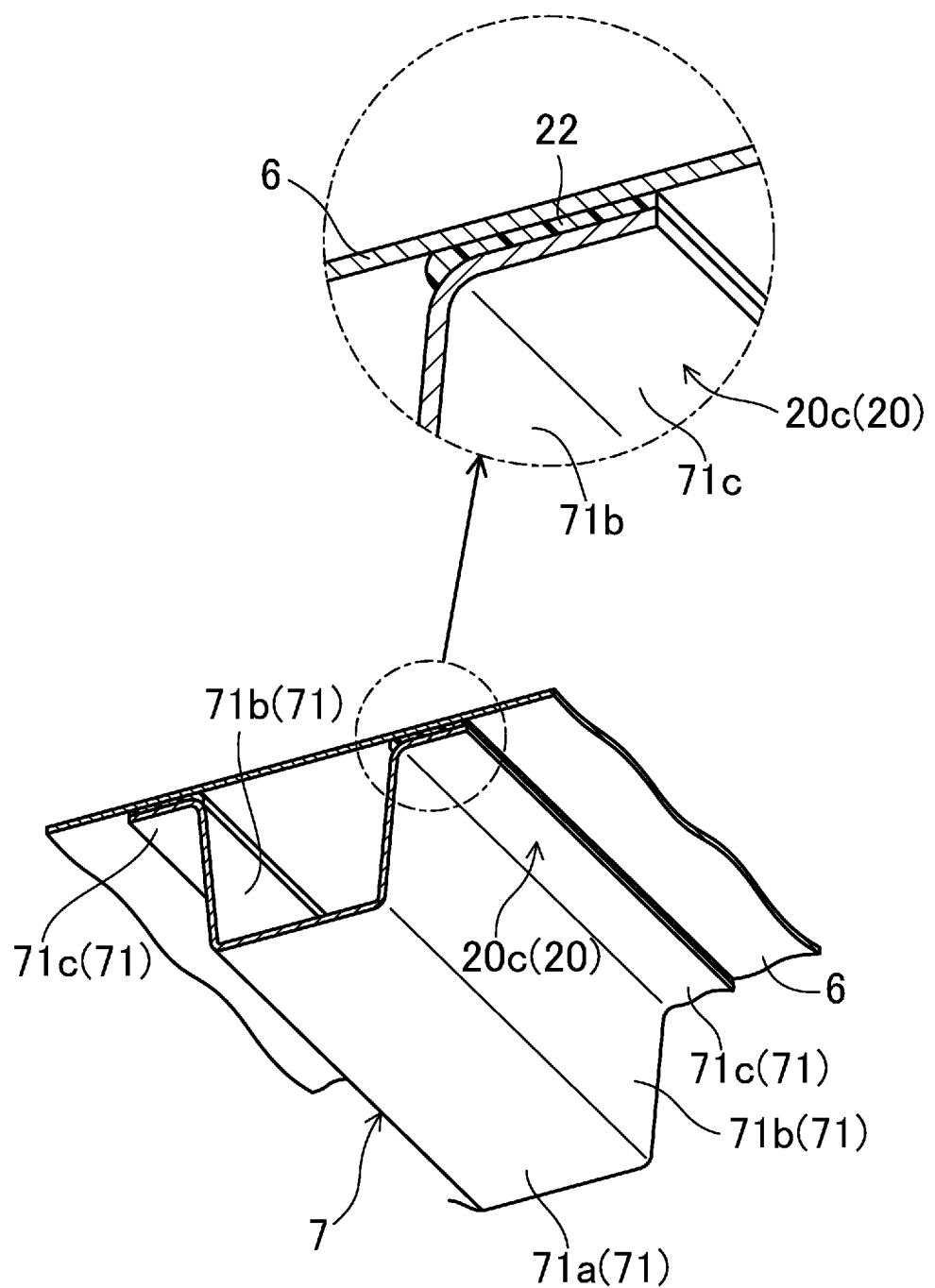
FIG. 4 is a schematic perspective view of a second joining part between the floor panel and a frame.

FIG. 4 illustrates the second joining part 20c of the floor panel 6 and the frame 7. The frame 7 is formed by joining a frame main body 71 as a long member with a hat-shaped cross section to a lower face (another face) of the floor panel 6 similarly to the cross member 5. The frame main body 71 has a strip-shaped frame main wall part 71a, a pair of frame side wall parts 71b and 71b extending on both side edges of the frame main wall part 71a across the entire length thereof while facing each other, and a pair of frame flange parts 71c and 71c projecting in mutually opposite directions from respective edges of the frame side wall parts 71b across the entire length thereof.

The frame flange parts 71c and 71c are provided substantially in parallel with each other so as to extend in their longitudinal directions at both ends in a width direction of the frame main body 71 and are joined to the floor panel 6 with a second adhesive 22 (adhesive) with damping performance. In other words, the second joining part 20c includes the frame flange parts 71c and 71c, the floor panel 6, and the second adhesive 22 that adheres to, and joins together. both of them. The second joining part 20c thus forms a pair of facing joining parts extending in parallel with each other so as to face each other with a certain spacing therebetween. A closed section structure is formed by the main wall part 71a and the pair of frame side wall parts 71b and 71b of the frame main body 71 and the floor panel 6 between the pair of facing joining parts. The closed section structure is formed, whereby the rigidity of the body 1 is structurally enhanced.

In the second joining part 20c formed so as to extend in the longitudinal direction of the frame 7, the second adhesive 22 is placed continuously along an extension direction of the second joining part 20c as illustrated in FIG. 4.

The frame flange parts 71c and 71c can also be formed so as to extend long and thin with a small width similarly to the flange parts 51c and 51c of the cross member 5. For this reason, in one preferred embodiment, in view of dispersing adhesiveness in the second joining part 20c and stably achieving both high rigidity and high damping performance, the second adhesive 22 is provided in a continuous manner without any substantial break in the extension direction of the second joining part 20c to give a uniform joined state across the entire second joining part 20c.

As illustrated in FIG. 4 also in the second joining part 20c, similarly to the first joining part 20b, the second adhesive 22 may be provided along an edge part facing the inside of the closed section structure. This can substantially prevent the second joining part 20c from opening and deformation from progressing when an external force such as a torsional force is exerted on the closed section structure and can thus increase rigidity also structurally.

Panel Joining Part

Figure 5:
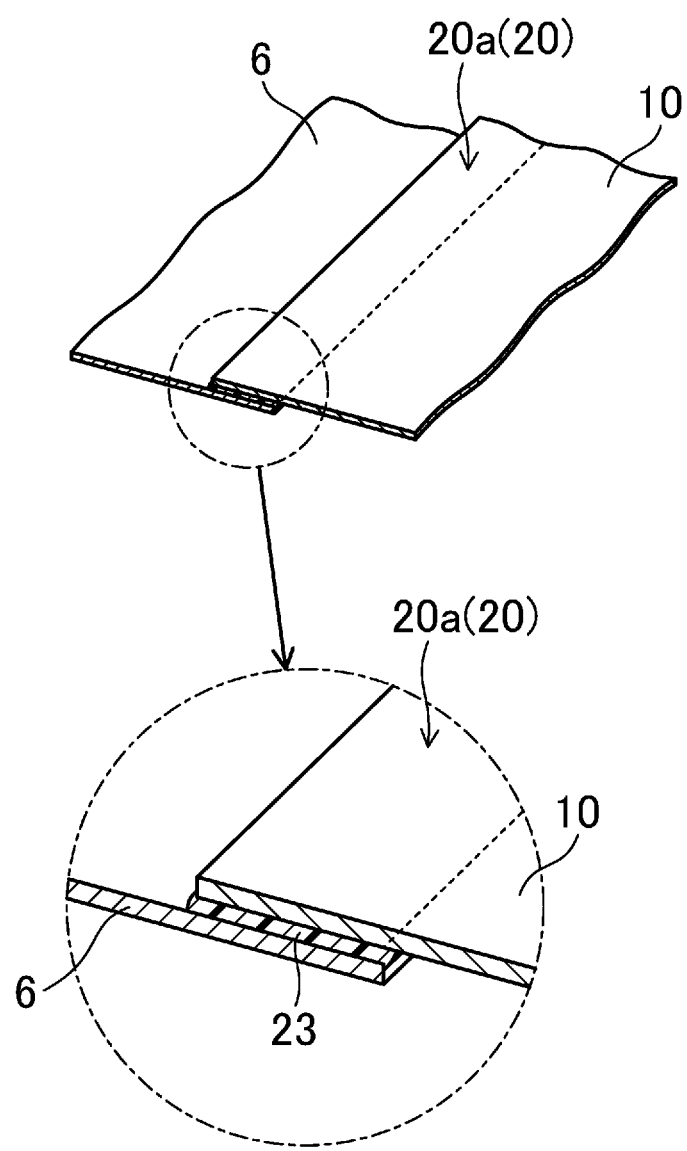
FIG. 5 is a schematic perspective view of a panel joining part between a front panel and the floor panel.

FIG. 5 illustrates the panel joining part 20a of the floor panel 6 and the front panel 10. The fore end part of the floor panel 6 (an end part of the panel member) extending in the vehicle width direction is connected to an aft end part of the front panel 10 (an end part of the additional panel member) extending in the vehicle width direction in an overlapped manner with a certain width. The parts connected in a band shape so as to extend in the vehicle width direction are joined together, whereby the panel joining part 20a is formed. In other words, the panel joining part 20a is formed so as to extend along the fore end part of the floor panel 6 and the aft end part of the front panel 10.

A panel adhesive 23 is interposed between a joining face of the fore end part of the floor panel 6 and a joining face of the aft end part of the front panel 10 included in the panel joining part 20a; this panel adhesive 23 adheres to the joining faces of both the floor panel 6 and the front panel 10, whereby the panel joining part 20a is formed.

As illustrated in FIG. 5, also in the panel joining part 20a, similarly to the first joining part 20b and the second joining part 20c, the panel adhesive 23 may be provided along an edge part of the panel joining part 20a. This case can also structurally increase rigidity similarly to the closed section structure formed in the first joining part 20b and the second joining part 20c.

The configuration of the panel joining part 20a of the floor panel 6 and the rear panel 11 is the same as the configuration of the panel joining part 20a of the floor panel 6 and the front panel 10, and a description thereof is omitted.

Adhesive

The joining part 20 requires high rigidity due to the necessity of ensuring body strength, and adhesives having properties of high rigidity with a storage elastic modulus of more than 1,500 MPa, for example, are generally used. On the other hand, higher rigidity makes it easier for vibration to transmit in general, and in view of substantially preventing the transmission of vibration occurring when an automobile is traveling and the like to achieve comfortable riding characteristics, an adhesive having damping performance that can damp vibration while ensuring high rigidity is preferably used for the joining part 20 of the body 1, especially parts forming the vehicle cabin 2 housing passengers.

However, the loss factor of adhesives having a storage elastic modulus of more than 1,500 MPa generally employed is generally about 0.05, and a damping effect required for the vibration of the body 1 cannot be obtained.

In this respect, the inventors of the present application have found out by CAE analysis that even when the storage elastic modulus of an adhesive is reduced to 100 MPa from about 2,000 MPa as a conventional one, a reduction in the rigidity of the joining part 20 of members forming the body 1 is limited to about 20% and have also found out that when the storage elastic modulus is more than 500 MPa, there is almost no difference in the rigidity of the joining part 20.

If the storage elastic modulus can be reduced, the loss factor can be increased. When the storage elastic modulus is 500 MPa, for example, the loss factor can even be 0.4 or more. Consequently, high damping performance can be achieved.

On the basis of such knowledge, a damping adhesive having specific characteristics is used as the first adhesive 21, the second adhesive 22, and the panel adhesive 23 for the joining part 20 of the body 1. Specifically, an adhesive having characteristics with a storage elastic modulus of within a range of 100 MPa to 800 MPa and a loss factor of 0.2 or more under conditions with a temperature of 20° C. and an exciting force frequency of 60 Hz is used.

A temperature of 20° C. is a temperature corresponding to room temperature and represents a standard temperature condition in specifying the properties of the adhesive. An exciting force with a frequency of 60 Hz corresponds to vibration that is likely to give passengers a feeling of displeasure, and achieving high damping performance on these conditions can improve the comfort (noise, vibration, harshness (NVH)) of an automobile.

An adhesive having the characteristics described above is used for the joining part 20, whereby both high rigidity and high damping performance can be achieved in the body 1, and thus improvement in riding characteristics and noise reduction can be achieved while ensuring body strength.

In view of obtaining the joining part 20 with high rigidity and high damping performance, the storage elastic modulus is preferably within a range of 300 MPa to 700 MPa, more preferably within a range of 450 MPa to 600 MPa, and further, even more preferably within a range of more than 500 MPa and 600 MPa or less.

The loss factor is preferably 0.3 or more and more preferably 0.4 or more than 0.2 or more. A larger loss factor gives a larger vibration damping effect and can thus further improve comfort.

Other Configurations

As illustrated in FIG. 3 to FIG. 5, part of the adhesives may protrude from an edge part of the joining part 20. This can stably provide an adhering part along the edge part of the joining part 20 even when some variations in the amount of application and the position of application occur when the adhesives are applied to the joining part 20 and can thus substantially prevent the opening with higher precision.

At least either of the body forming members forming the joining part 20 can have a thickness of less than 2 mm. Specifically, at least either the floor panel 6 or the cross member 5 in the first joining part 20b, at least either the floor panel 6 or the frame 7 in the second joining part 20c, and at least either the floor panel 6 or the front panel 10 (or the rear panel 11) in the panel joining part 20a can have a thickness of less than 2 mm, for example.

When the thickness of both the body forming members forming the joining part 20 is 2.0 mm or more, the rigidity of the body forming members is excessive relative to the rigidity of the adhesive while an external force such as torsion is exerted on the joining part 20. Consequently, the body forming members are difficult to appropriately bend along with the rigidity of the adhesive, and the damping performance improvement effect is not obtained.

In contrast, when the thickness of at least either of both the body forming members forming the joining part 20 is less than 2 mm, along with the rigidity of the adhesive, at least the body forming member the thickness of which is less than 2 mm out of the body forming members appropriately bends, and along therewith a load such as shear is input to the adhesive placed in the joining part 20, and the damping performance improvement effect is obtained. A smaller thickness of the body forming members can expect an increase in the rate of improvement in damping performance and is advantageous also in view of reductions in member costs and body weight.

Coupling parts between the side sills 3 and the floor panel 6, coupling parts between the tunnel reinforcement 4 and the floor panel 6, and the like are also joined together with the damping adhesive similarly to these members.

Crossing Part

As illustrated in FIG. 2, the frames 7 are formed so as to extend in the vehicle fore-and-aft direction on the downside of the floor panel 6, whereas the cross members 5 are formed so as to cross the frames 7 and extend in the vehicle width direction on the upside of the floor panel 6.

Figure 6:
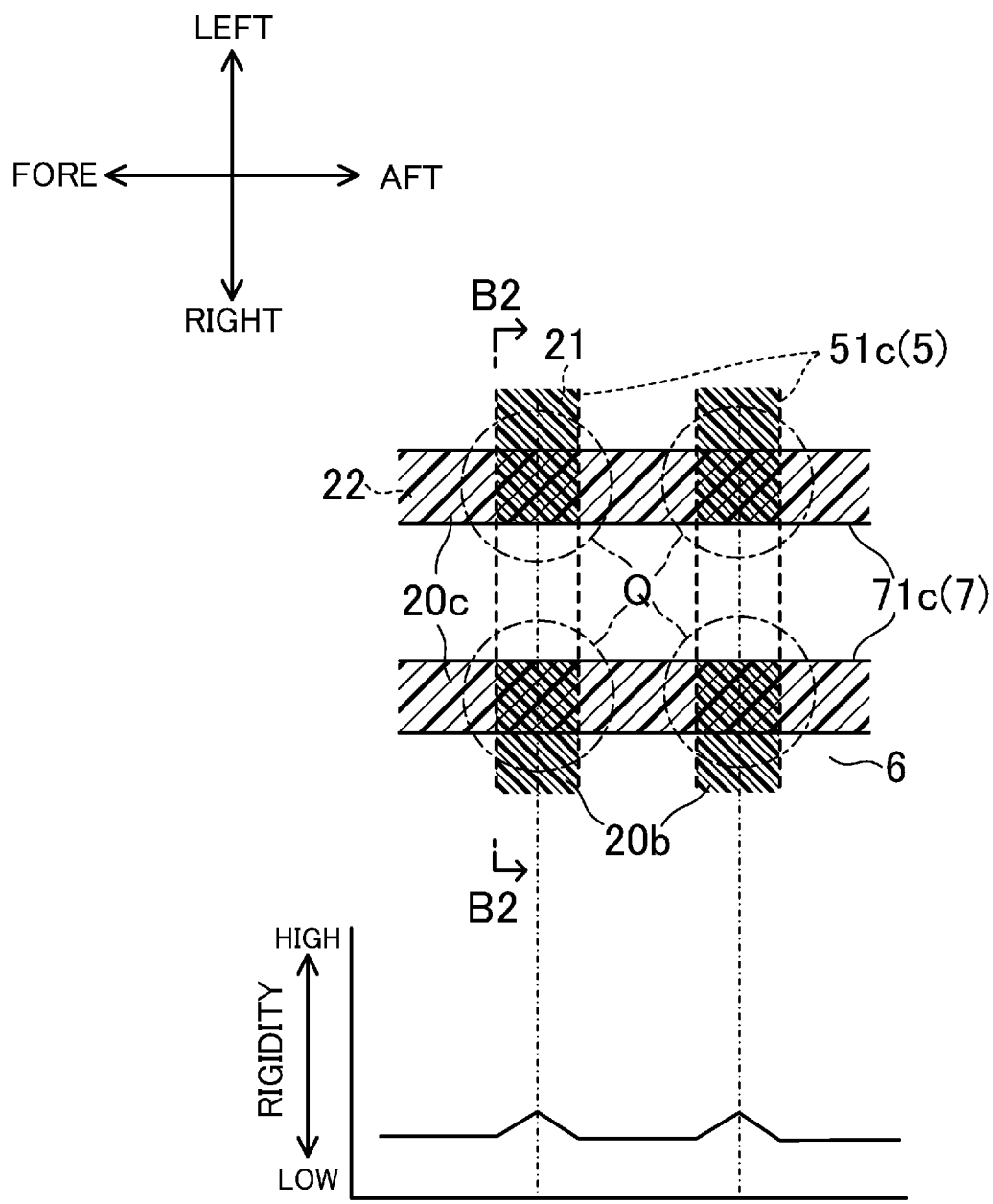
FIG. 6 is a schematic enlarged view of a part indicated by the symbol A2 in FIG. 2 and a graph for illustrating the degree of rigidity.
Figure 7:
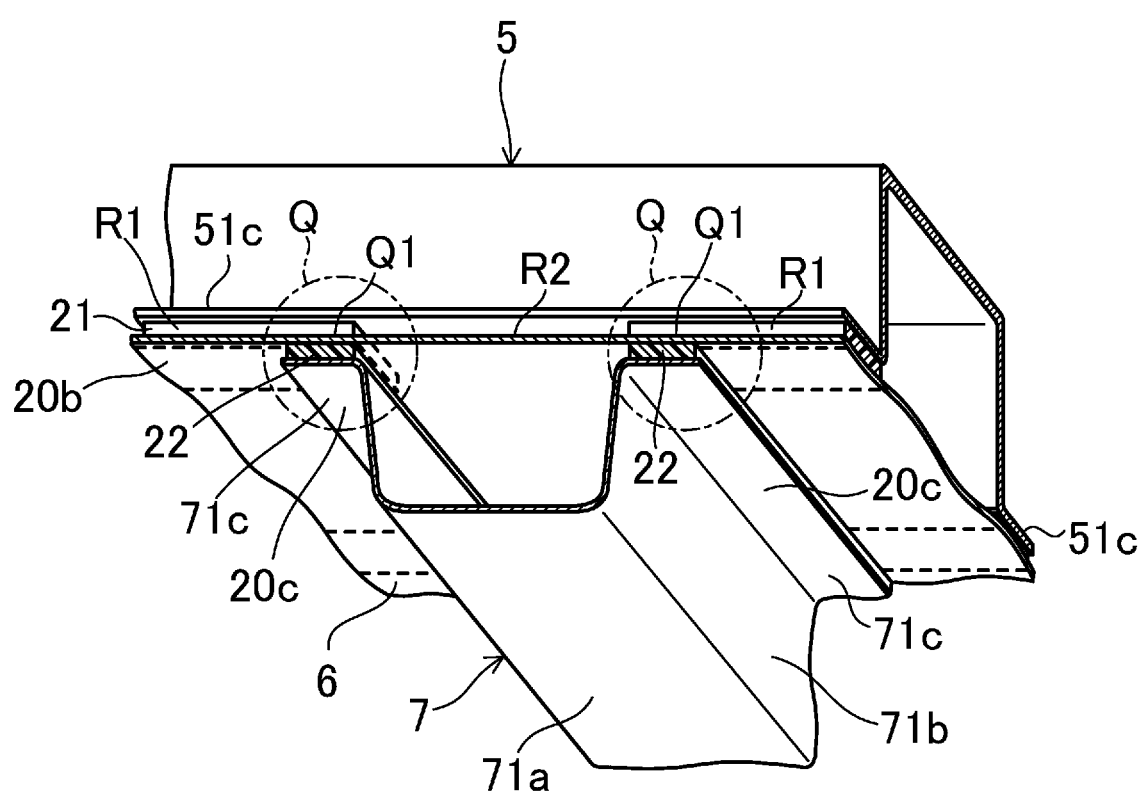
FIG. 7 is a sectional perspective view along the B2-B2 line in FIG. 6.

A part indicated by the symbol A2 in FIG. 2 is a part in which the cross member 5, the floor panel 6, and the frame 7 overlap with each other in the up-and-down direction. FIG. 6 illustrates a schematic enlarged view of the part indicated by the symbol A2. The lower part of FIG. 6 illustrates a graph schematically showing the degree of rigidity in the vehicle fore-and-aft direction of the joining part 20. FIG. 7 is a sectional perspective view along the B2-B2 line in FIG. 6.

As illustrated in FIG. 6 and FIG. 7, parts in which the cross member 5, the floor panel 6, and the frame 7 overlap with each other in the up-and-down direction form stacking parts Q in which the flange parts 51c and 51c of the cross member main body 51, the floor panel 6, and the frame flange parts 71c and 71c of the frame main body 71 are stacked in the up-and-down direction. In other words, the stacking parts Q are each a part in which the first joining part 20*b* and the second joining part 20*c* overlap with each other.

The first joining part 20*b* includes a crossing part Q1 that overlaps with the second joining part 20*c* to form the stacking part Q and a first adjacent part R1 and a second adjacent part R2 as adjacent parts that are adjacent to this crossing part Q1 and do not overlap with the second joining part 20*c* (hereinafter, the first adjacent part R1 and the second adjacent part R2 may be referred to as "adjacent parts R1 and R2").

The first adjacent part R1 is a part in which the frame 7 is not placed on the downside of the floor panel 6. The second adjacent part R2 is a part in which the frame main wall part 71*a* and the pair of frame side wall parts 71*b* and 71*b* of the frame 7 are placed on the downside of the floor panel 6 and can be said to be the first joining part 20*b* positioned at a part forming the closed section structure in conjunction with the frame main wall part 71*a* and the pair of frame side wall parts 71*b* and 71*b*.

As illustrated in FIG. 6 and FIG. 7, the present disclosed technique is characterized in that an adhesive amount per unit area of the first adhesive 21 in the second adjacent part R2 is smaller than an adhesive amount per unit area of the first adhesive 21 in the first adjacent part R1. The following describes its effects.

Figure 26:
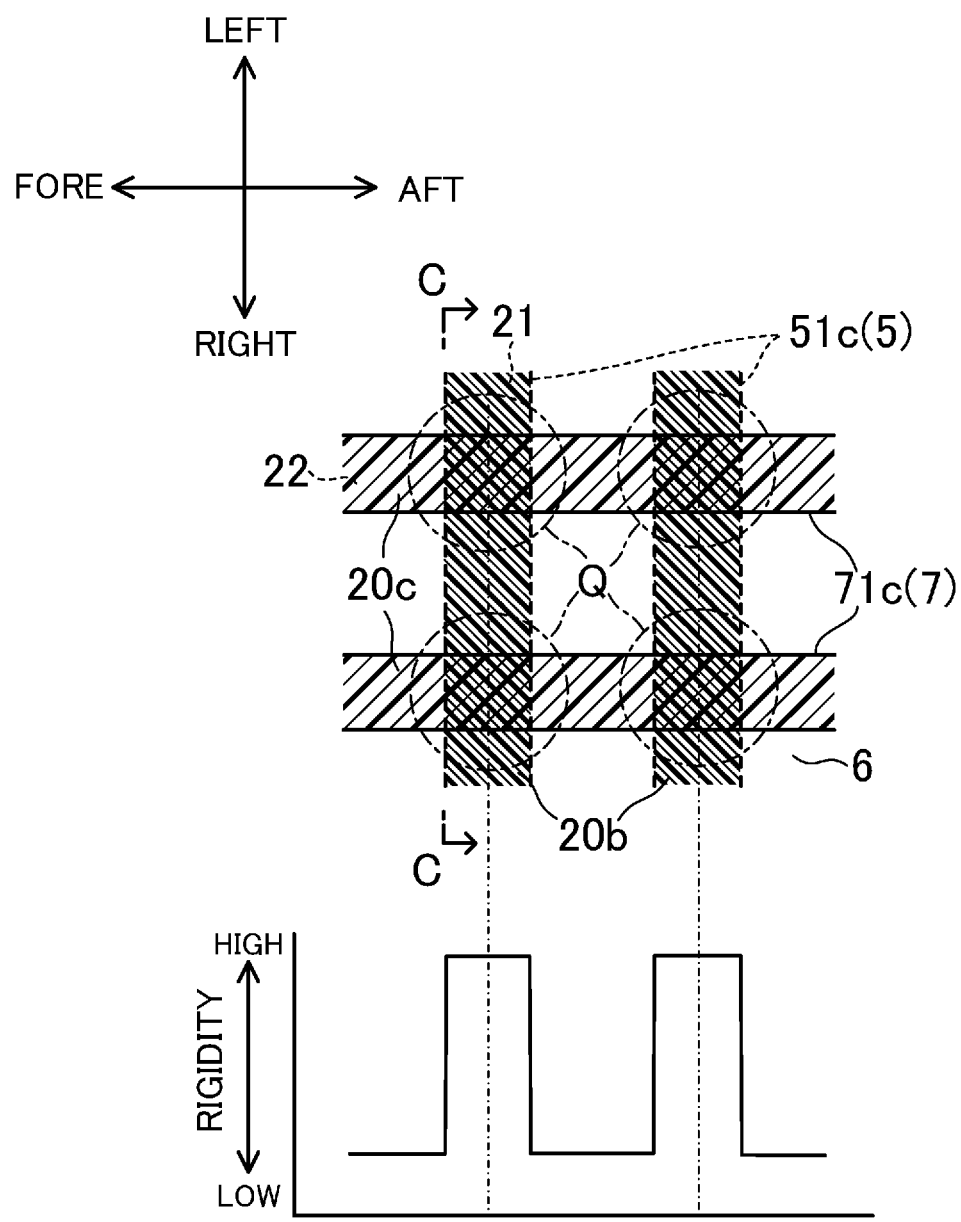
FIG. 26 is a diagram corresponding to FIG. 6 of a body structure having a conventional configuration in which a first adhesive has been uniformly applied to the entire first joining part.
Figure 27:
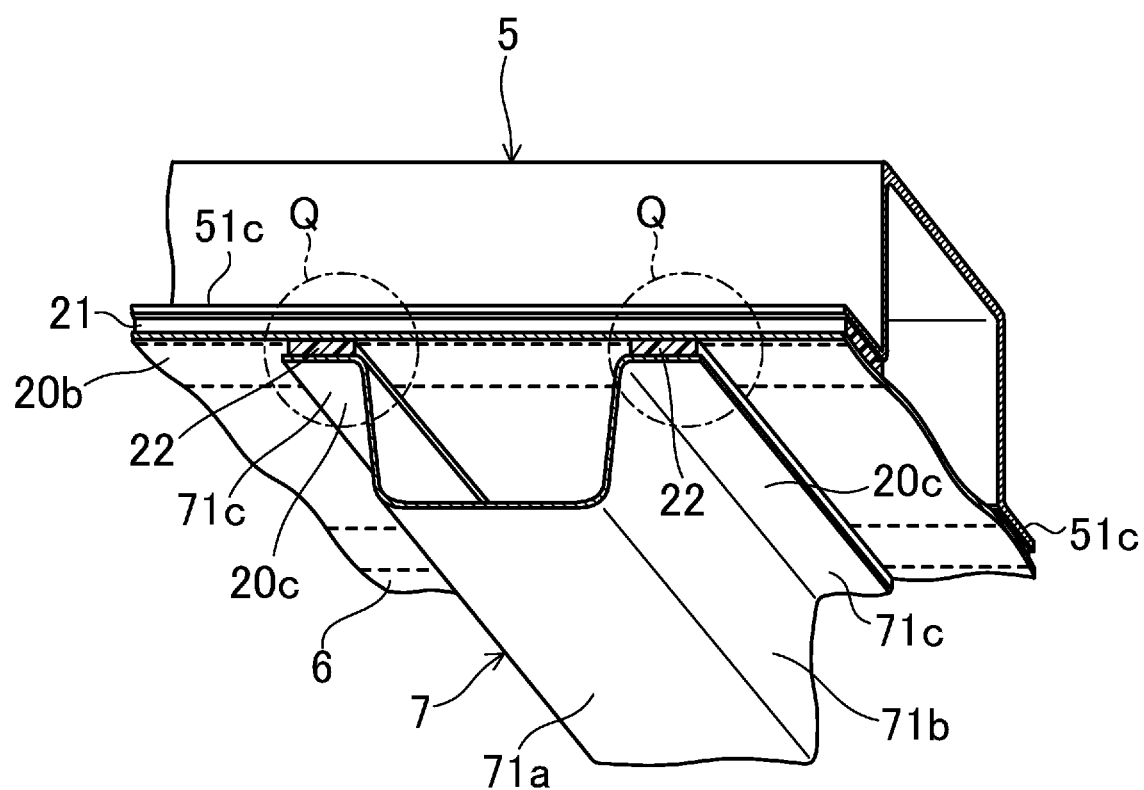
FIG. 27 is sectional perspective view along the C-C line in FIG. 26.

FIG. 26 and FIG. 27 illustrate a state when the first adhesive 21 is placed across the entire first joining part 20*b* including the second adjacent part R2. In other words, the first adhesive 21 is placed continuously and uniformly also in the second adjacent part R2 in FIG. 7 similarly to the first adjacent part R1.

The floor panel 6 positioned at the second adjacent part R2 forms the closed section structure in conjunction with the frame 7 and thus significantly receives the influence of vibration transmitted through the frame 7, for example. Consequently, when the first adhesive 21 is thus placed uniformly across the entire first joining part 20*b*, as illustrated in the lower part of FIG. 26, rigidity in the vehicle fore-and-aft direction tends to extremely increase in the second adjacent part R2. When rigidity in the second adjacent part R2 extremely increases, damping performance in the second adjacent part R2 reduces, and in terms of the vehicle fore-and-aft direction, vibration transmission from the frame 7 to the floor panel 6 can be conversely facilitated, for example, and vibration damping performance in a specific frequency band can be reduced.

In contrast, as illustrated in FIG. 6 and FIG. 7, the present disclosed technique makes the adhesive amount per unit area of the first adhesive 21 in the second adjacent part R2 smaller than that in the first adjacent part R1 and can thereby reduce the adhesiveness between the flange part 51*c* and the floor panel 6 in the second adjacent part R2. This reduces rigidity in the second adjacent part R2 and thus substantially prevents rigidity fluctuations along the frame 7 in the vehicle fore-and-aft direction. Thus, the continuity of rigidity along the frame 7 in the vehicle fore-and-aft direction can be maintained, the reduction in vibration damping performance in the specific frequency band can be substantially prevented, and vibration transmission from the frame 7 to the floor panel 6 and from the cross member 5 to the floor panel 6 can be substantially prevented. Consequently, joining parts with high rigidity and high damping performance can be brought about, and comfort can be improved while ensuring body strength.

As to the adhesive amount per unit area of the first adhesive 21, the adhesive amount in the second adjacent part R2 can be preferably 50% or less, more preferably 40% or less, and further preferably 30% or less of the adhesive amount in the first adjacent part R1. In a particularly preferred aspect, the adhesive amount in the second adjacent part R2 may be zero as described below.

In the present specification, "the adhesive amount per unit area" refers to an adhesive amount per unit area at any place of the second adjacent part R2, for example, and also includes the average of an adhesive amount per unit area in the entire one second adjacent part R2 out of the two second adjacent parts R2 illustrated in FIG. 6 and FIG. 7, for example. Specifically, not only a case in which the adhesive is uniformly applied in one second adjacent part R2, for example, but also a case is included in which the adhesive is applied in a dot shape, for example, to locally give a place in which the adhesive amount per unit area is larger and a place in which it is smaller, but the average of the entire one second adjacent part R2 satisfies the range of the adhesive amount described above. When the average value is referred to for the adhesive amount per unit area in the first adjacent part R1, the average of the adhesive amount per unit area of a part having an area equal to the area of the crossing part Q1 at a place adjacent to the first adjacent part R1 is referred to.

A plurality of second adjacent parts R2 can be formed within one body 1; the adhesive amounts of all the second adjacent parts R2 are not necessarily the same, and the adhesive amounts can be increased or decreased as appropriate depending on the position of the second adjacent parts R2.

Specifically, as illustrated in FIG. 2, a plurality of (two in the present embodiment) cross members 5 are provided spaced apart from each other in the vehicle fore-and-aft direction, and the second adjacent parts R2 are also formed at a plurality of places.

FIG. 8 is a diagram schematically illustrating a state of vibration of the floor panel 6 and the cross member 5 when an external force is exerted on the front panel 10 and the rear panel 11. For the sake of simplicity, the frame 7 is not illustrated.

In FIG. 8, the broken line indicates a configuration before the external force in exerted, whereas the solid line indicates a configuration when the external force has been exerted from the front side and the rear side. As indicated by the blank arrows with the symbols S1 and S2 in FIG. 8, when the external force is exerted on the front panel 10 and the rear panel 11 from below, for example, vibration in the fore-and-aft direction transmitted from the front panel 10 and the rear panel 11 is input to the floor panel 6 with the panel joining parts 20*a* at positions indicated by the black arrows with the symbols H1 and H2 as entrances to be transmitted to the floor panel 6 and can be amplitude loops at positions indicated by the black arrows with the symbols T1 and T3. In other words, the amplitude of the floor panel 6 can be larger at the positions indicated by the black arrows with the symbols T1 and T3 than at the position of the black arrow indicated by the symbol T2.

Given these circumstances, making the adhesive amount per unit area of the first adhesive 21 in one second adjacent part R2 close to the position of the amplitude loop smaller than the adhesive amount per unit area of the first adhesive 21 in another second adjacent part R2 far from the position of the amplitude loop is effective in view of substantially preventing vibration transmission. Specifically, in one preferred embodiment, the adhesive amount per unit area of the first adhesive 21 in the second adjacent part R2 formed in the first joining part 20*b* of the cross member 5 close to the position indicated by the symbol T3 in FIG. 8 is made smaller than the adhesive amount per unit area of the first adhesive 21 in the second adjacent part R2 formed in the first joining part 20b of the cross member 5 close to the position indicated by the symbol T2, for example.

The front side and the rear side of the floor panel 6 can be input sources of vibration transmitted from an engine, suspensions, and the like (not illustrated) to the floor panel 6 via the front panel 10, the rear panel 11, and the frame 7. This can make it difficult to ensure damping performance when the joining part 20 positioned on the front side and the rear side is extremely high in rigidity.

Given these circumstances, the adhesive amount per unit area of the first adhesive 21 in the second adjacent part R2 positioned on both sides in the fore-and-aft direction of the floor panel 6, that is, the front side and the rear side thereof may be set to be smaller than the adhesive amount per unit area of the first adhesive 21 in the second adjacent part R2 positioned around the center of the floor panel 6. This setting can effectively substantially prevent vibration transmission and can improve comfort while ensuring body strength.

In one preferred embodiment, in view of ensuring the continuity of rigidity and achieving both high rigidity and high damping performance, as illustrated in FIG. 7 in particular, the first adhesive 21 is not placed in the second adjacent part R2 at all.

Figure 9A:
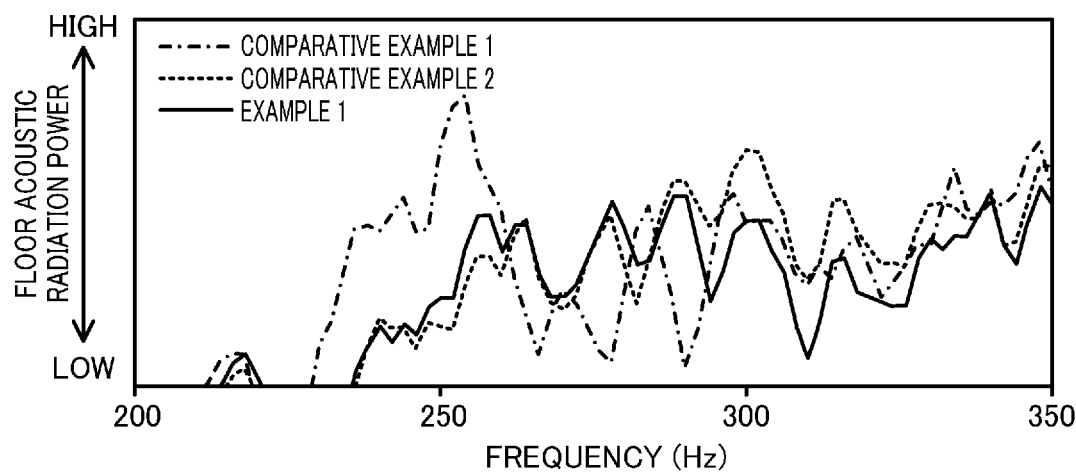
FIG. 9A is a graph indicating the frequency dependence of acoustic radiation power of the floor panel when vibration is input from a rear panel in the configurations of Example 1 and Comparative Examples 1 and 2.
Figure 9B:
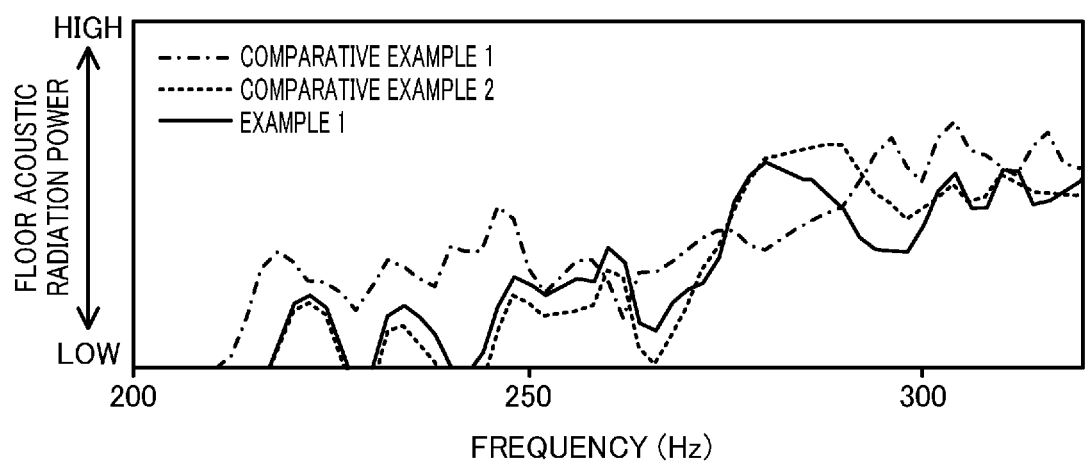
FIG. 9B is a graph indicating the frequency dependence of acoustic radiation power of the floor panel when vibration is input from the front panel in the configurations of Example 1 and Comparative Examples 1 and 2.

FIG. 9A and FIG. 9B are results obtained by calculating floor acoustic radiation power versus frequency using CAE analysis for vibration transmitted to the floor panel 6 in the configuration illustrated in FIG. 2. FIG. 9A and FIG. 9B are results when vibration input from the rear panel 11 and the front panel 10 is assumed, respectively.

In FIGS. 9A and 9B, Comparative Example 1 indicated by the dashed-dotted curve is a result when the first adhesive 21 and the second adhesive 22 are not placed in the first joining part 20b and the second joining part 20c; Comparative Examples 2 indicated by the broken curve is a result when the first adhesive 21 and the second adhesive 22 are placed uniformly across the entire first joining part 20b and second joining part 20c as illustrated in FIG. 26 and FIG. 27; and Example 1 indicated by the solid curve is a result when the adhesive amount of the first adhesive 21 in all the second adjacent parts R2 is zero as illustrated in FIG. 6 and FIG. 7.

As illustrated in FIG. 9A, it is revealed that when vibration input from the rear panel 11 is assumed, near a frequency band of 250 Hz, floor acoustic radiation power significantly reduces, and vibration transmitted to the floor panel 6 is reduced from Comparative Example 1 to Comparative Example 2. In contrast, it is revealed that near a frequency band of 300 Hz, floor acoustic radiation power increases, and vibration transmitted to the floor panel 6 increases in Comparative Example 2 compared with Comparative Example 1. It is revealed that in Example 1 the increase in floor acoustic radiation power near the frequency band of 300 Hz is substantially prevented compared with Comparative Example 2.

As illustrated in FIG. 9B, it is revealed that also in a case in which vibration input from the front panel 10 is assumed, in Example 1 a reduction in floor acoustic radiation power is shown compared with Comparative Example 2 near a frequency band of 290 Hz, and vibration transmission is substantially prevented.

The first adhesive 21 is thus not placed in the second adjacent part R2 at all, whereby damping performance in the joining part 20 can be ensured, and vibration transmission to the floor panel 6 can be substantially prevented.

Second Embodiment

The following describes other embodiments according to the present disclosure in detail. In descriptions of these embodiments, the same parts as those of the first embodiment are denoted by the same symbols, and detailed descriptions thereof are omitted.

Although in the first embodiment as to the adhesive amount of the first adhesive 21 the adhesive amount in the second adjacent part R2 is made smaller than the adhesive amount in the first adjacent part R1, an adhesive amount in the crossing part Q1 may also be made smaller than the adhesive amount in the first adjacent part R1.

Figure 10:
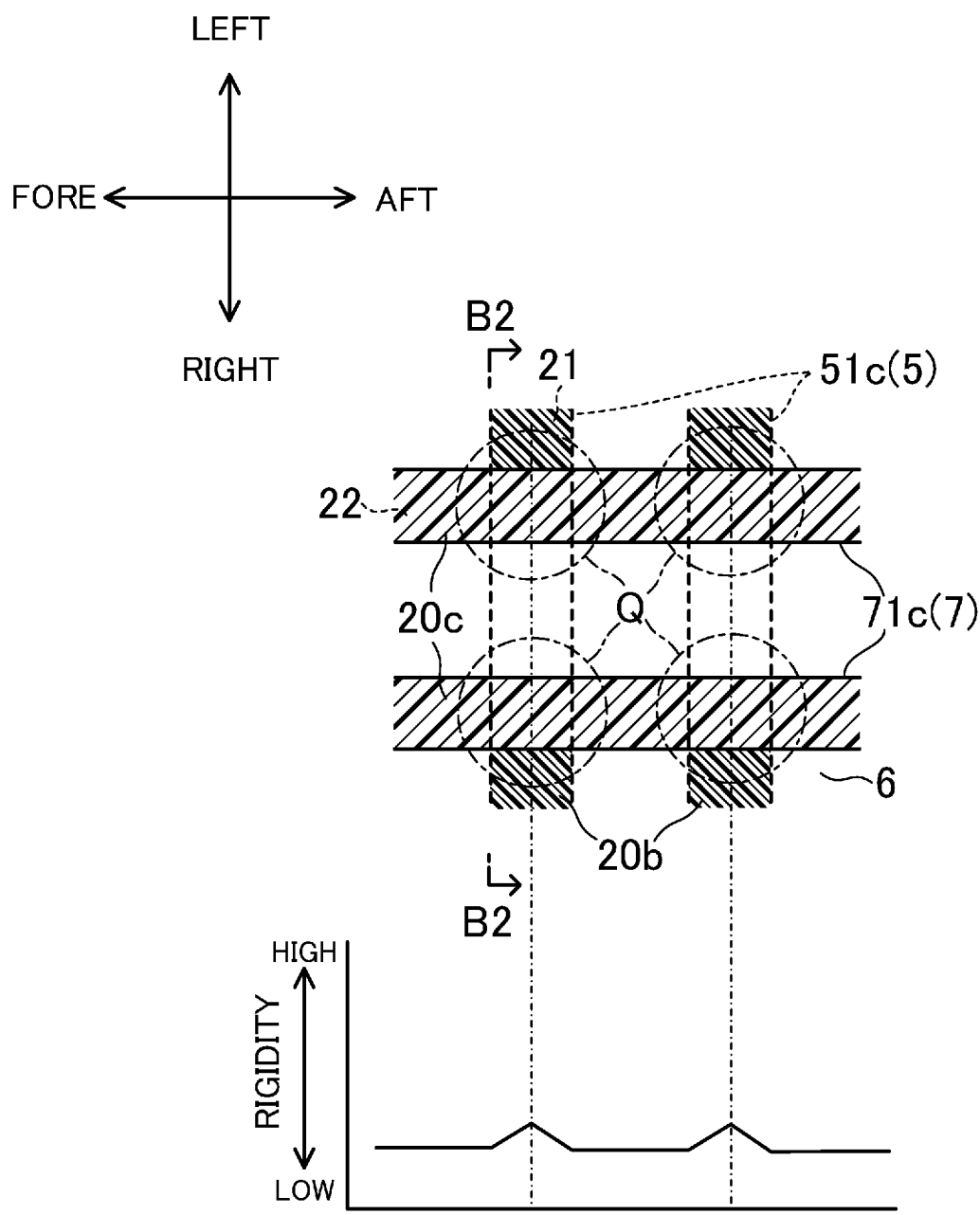
FIG. 10 is a diagram corresponding to FIG. 6 of a configuration according to a second embodiment.
Figure 11:
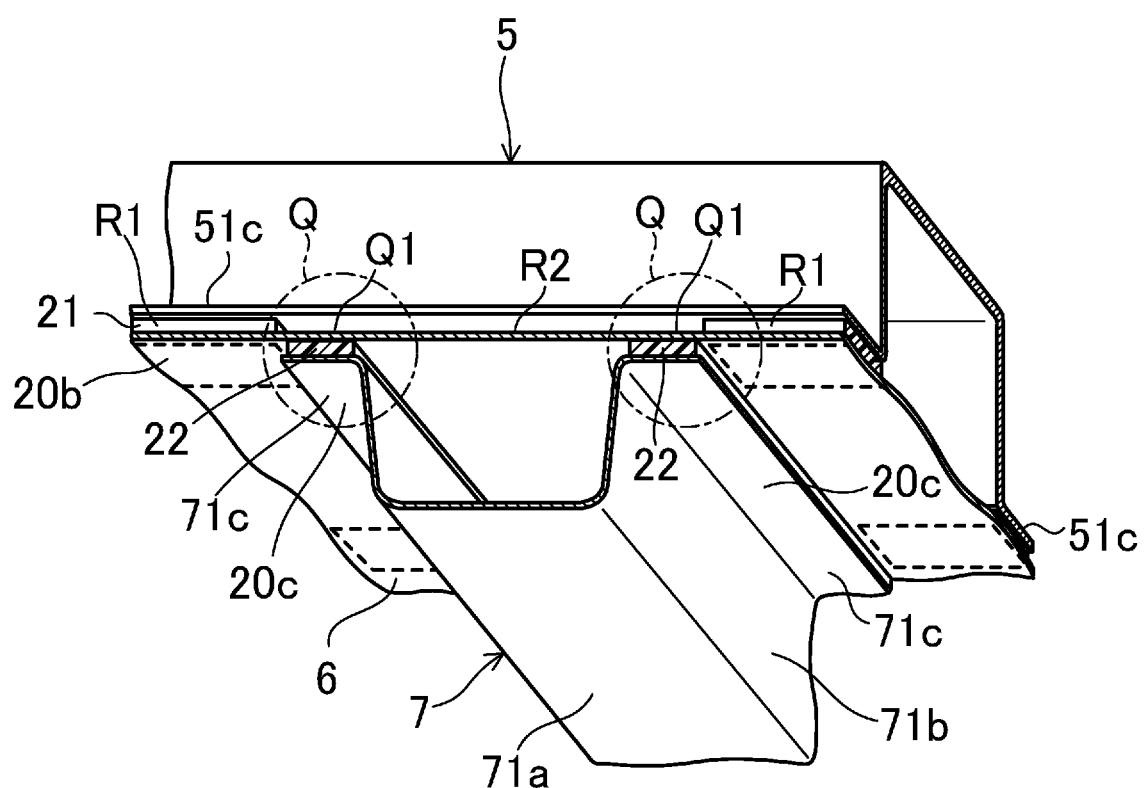
FIG. 11 is a sectional perspective view along the B2-B2 line in FIG. 10.

Specifically, as illustrated in FIG. 10 and FIG. 11, in addition to the second adjacent part R2, the adhesive amount is made smaller also in the crossing part Q1.

In the part of the second joining part 20c positioned at the stacking part Q, the second adhesive 22 is placed, in which the adhesive amount per unit area of the first adhesive 21 in the crossing part Q1 of the stacking part Q is also made smaller than that in the first adjacent part R1, whereby the adhesiveness between the flange part 51c and the floor panel 6 in the crossing part Q1 can be reduced. This reduces rigidity in the crossing part Q1 and further substantially prevents rigidity fluctuations along the frame 7 in the vehicle fore-and-aft direction. Thus, the continuity of rigidity along the frame 7 in the vehicle fore-and-aft direction can be maintained, the reduction in vibration damping performance in the specific frequency band can be substantially prevented, and vibration transmission from the frame 7 to the floor panel 6 and from the cross member 5 to the floor panel 6 can be substantially prevented. Consequently, joining parts with high rigidity and high damping performance can be brought about, and comfort can be improved while ensuring body strength.

As to the adhesive amount per unit area of the first adhesive 21, on the basis of the idea on the adhesive amount in the second adjacent part R2, the adhesive amount in the crossing part Q1 can be preferably 50% or less, more preferably 40% or less, and further preferably 30% or less of the adhesive amount in the first adjacent part R1. In a particularly preferred aspect, the adhesive amount in the crossing part Q1 may be zero.

A plurality of crossing parts Q1 can be formed within one body 1; the adhesive amounts of all the crossing parts Q1 are not necessarily the same, and the adhesive amounts can be increased or decreased as appropriate depending on the position of the crossing parts Q1.

Specifically, as illustrated in FIG. 8, as described above, making the adhesive amount per unit area of the first adhesive 21 in one crossing part Q1 close to the position of the amplitude loop smaller than the adhesive amount per unit area of the first adhesive 21 in another crossing part Q1 far from the position of the amplitude loop is effective in view of substantially preventing vibration transmission.

The front side and the rear side of the floor panel 6 can be input sources of vibration transmitted from an engine, wheels, and the like (not illustrated) to the floor panel 6 via the front panel 10, the rear panel 11, and the frame 7. This can make it difficult to ensure damping performance when the joining part 20 positioned on the front side and the rear side is extremely high in rigidity.

The adhesive amount per unit area of the first adhesive 21 in the crossing part Q1 positioned on the front side and the rear side of the floor panel 6 may be set to be smaller than the adhesive amount per unit area of the first adhesive 21 in the crossing part Q1 positioned around the center of the floor panel 6. This setting can effectively substantially prevent vibration transmission and can improve comfort while ensuring body strength.

Third Embodiment

As illustrated in FIG. 2, the frame 7 extends in the fore-and-aft direction from the downside of the floor panel 6 to the downside of the front panel 10 the rear panel 11, in which as indicated by the symbol A1 in FIG. 2, for example, a part that overlaps with the second joining part 20c can be formed also in the panel joining part 20a.

Figure 12:
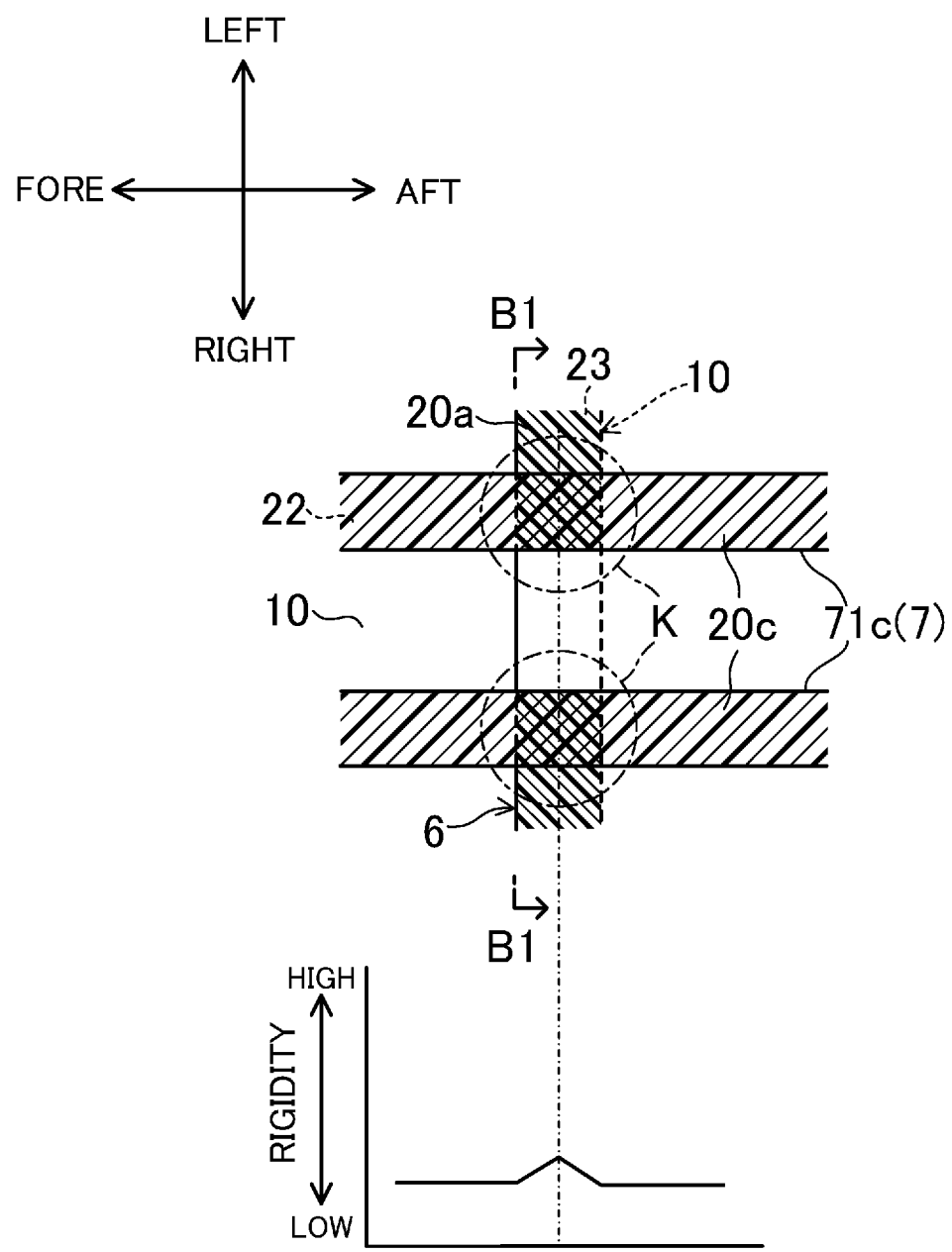
FIG. 12 is a schematic enlarged view of a part indicated by the symbol A1 in FIG. 2 and a graph for illustrating the degree of rigidity for a configuration according to a third embodiment.
Figure 13:
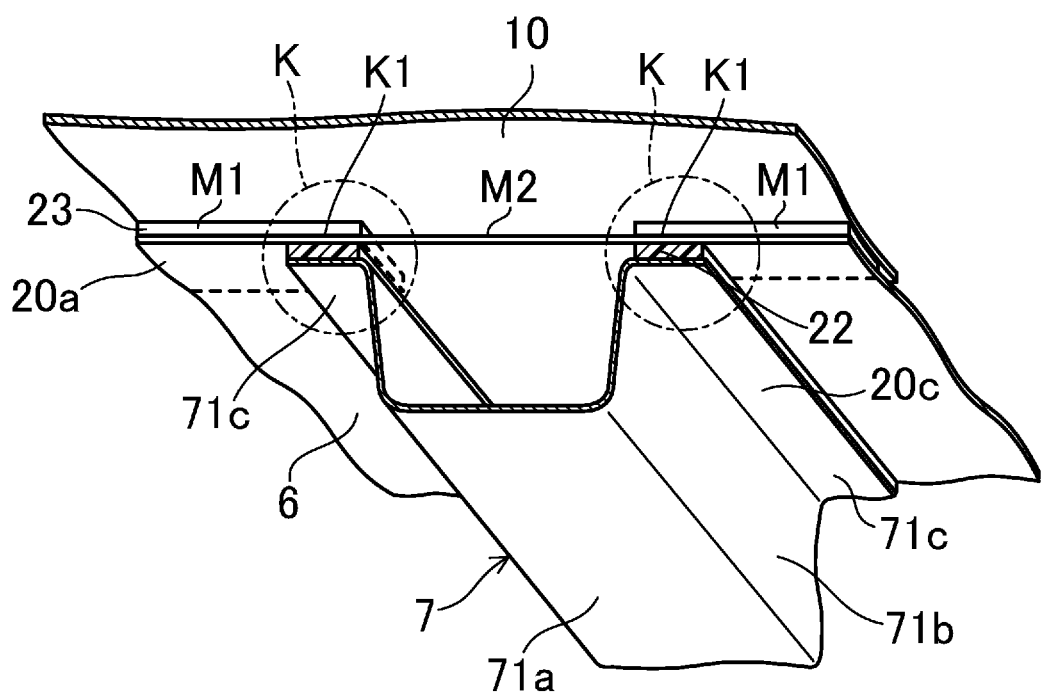
FIG. 13 is a partially sectional perspective view along the B1-B1 line in FIG. 12.

FIG. 12 illustrates an enlarged view of the part indicated by the symbol A1 in FIG. 2. FIG. 13 illustrates a sectional perspective view along the B1-B1 line in FIG. 12. As illustrated in FIG. 12 and FIG. 13, the part in which the panel joining part 20a and the second joining part 20c overlap with each other is named a panel stacking part K.

The panel joining part 20a includes a panel crossing part K1 that overlaps with the second joining part 20c to form the panel stacking part K and a first panel adjacent part M1 and a second panel adjacent part M2 as panel adjacent parts that are adjacent to this panel crossing part K1 and do not overlap with the second joining part 20c.

The first panel adjacent part M1 is a part in which the frame 7 is not placed on the downside of the floor panel 6. The second panel adjacent part M2 is a part in which the frame main wall part 71a and the pair of frame side wall parts 71b and 71b of the frame 7 are placed on the downside of the floor panel 6 and can be said to be the panel joining part 20a positioned at a part forming the closed section structure in conjunction with the frame main wall part 71a and the pair of frame side wall parts 71b and 71b.

As illustrated in FIG. 8, when an external force is exerted on the front panel 10 and the rear panel 11 from below, for example, as described above, vibration in the fore-and-aft direction transmitted from the front panel 10 and the rear panel 11 is input to the floor panel 6 with the panel joining parts 20a at the positions indicated by the black arrows with the symbols H1 and H2 as entrances.

Given these circumstances, damping vibration in the panel joining part 20a is also effective in reducing the vibration to be transmitted to the floor panel 6. In view of this point, similarly to the second adjacent part R2, an adhesive amount per unit area of the panel adhesive 23 in the second panel adjacent part M2 may be smaller than an adhesive amount per unit area of the panel adhesive 23 in the first panel adjacent part M1.

This setting can substantially prevent an extreme increase in rigidity in the second panel adjacent part M2. Thus, vibration transmission to the floor panel 6 can be effectively substantially prevented, and comfort can be improved while ensuring body strength.

As to the adhesive amount per unit area of the panel adhesive 23, on the basis of an idea similar to that on the adhesive amount in the second adjacent part R2, the adhesive amount in the second panel adjacent part M2 can be preferably 50% or less, more preferably 40% or less, and further preferably 30% or less of the adhesive amount in the first panel adjacent part M1. In a particularly preferred aspect, the adhesive amount in the second panel adjacent part M2 may be zero.

A plurality of second panel adjacent parts M2 can be formed within one body 1; the adhesive amounts of all the second panel adjacent parts M2 are not necessarily the same, and the adhesive amounts can be increased or decreased as appropriate depending on the position of the second panel adjacent parts M2.

In the panel joining part 20a, as illustrated in FIGS. 5 and 13, the panel adhesive 23 is placed continuously along the extension direction of the first joining part 20a in parts other than the second panel adjacent part M2.

The panel joining part 20a is formed by connecting end parts to each other and can be formed so as to extend long and thin with a small width. For this reason, in one preferred embodiment, to stably achieve both high rigidity and high damping performance, a uniform joined state is given across the entire panel joining part 20a. Consequently, in the panel joining part 20a, the panel adhesive 23 is provided in a continuous manner without any substantial break in the extension direction of the panel joining part 20a.

With this configuration, even when the width of the panel joining part 20a is small, uniform adhesiveness can be ensured across a wide range of the panel joining part 20a. Thus, even when an external force is locally exerted on the panel joining part 20a, the external force can be smoothly dispersed across the entire panel joining part 20a, and the rigidity of the body 1 can be increased.

Fourth Embodiment

In the configuration of the third embodiment, as to the adhesive amount per unit area of the panel adhesive 23, further, the adhesive amount in the panel crossing part K1 may be smaller than the adhesive amount in the first panel adjacent part M1.

Figure 14:
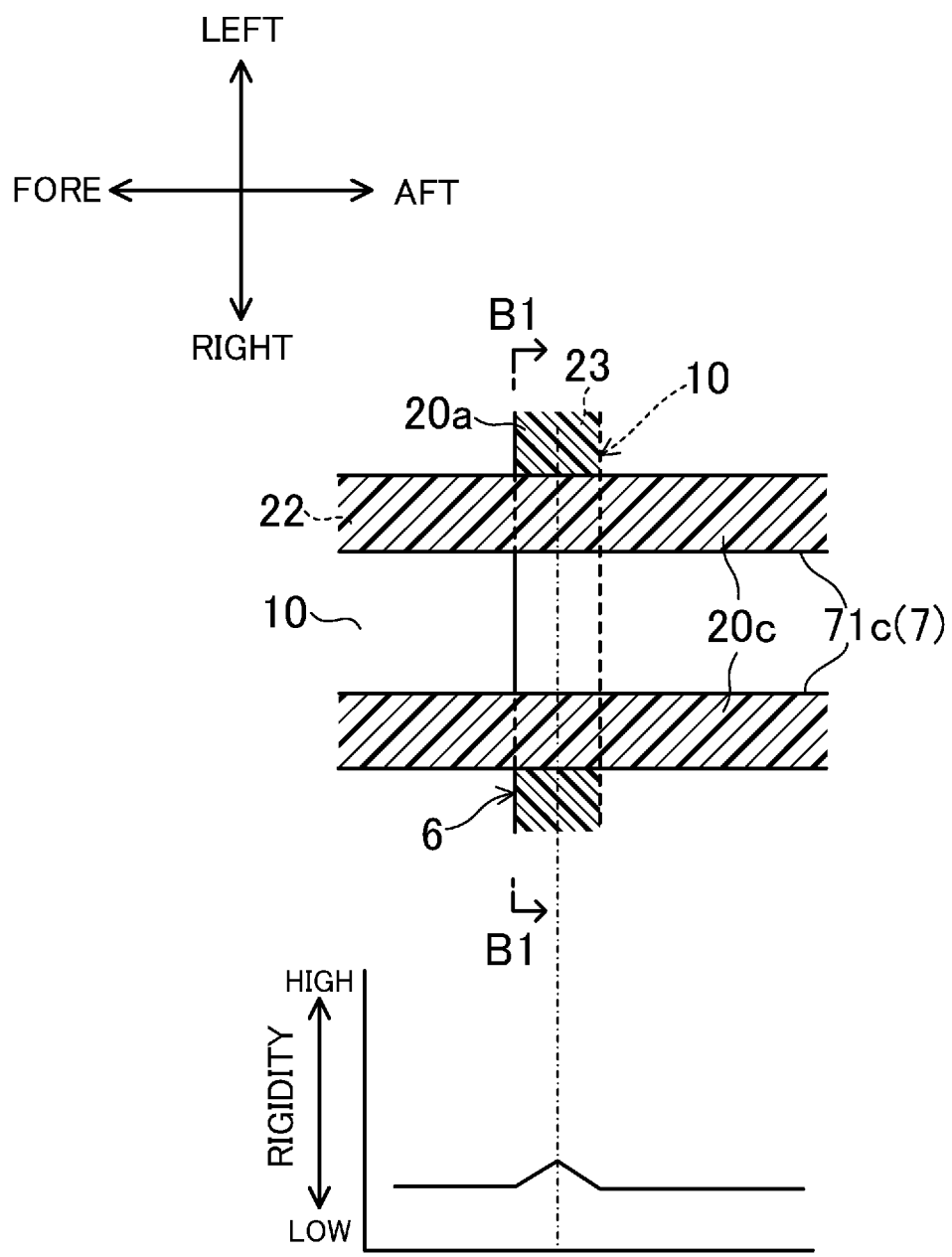
FIG. 14 is a diagram corresponding to FIG. 12 of a configuration according to a fourth embodiment.
Figure 15:
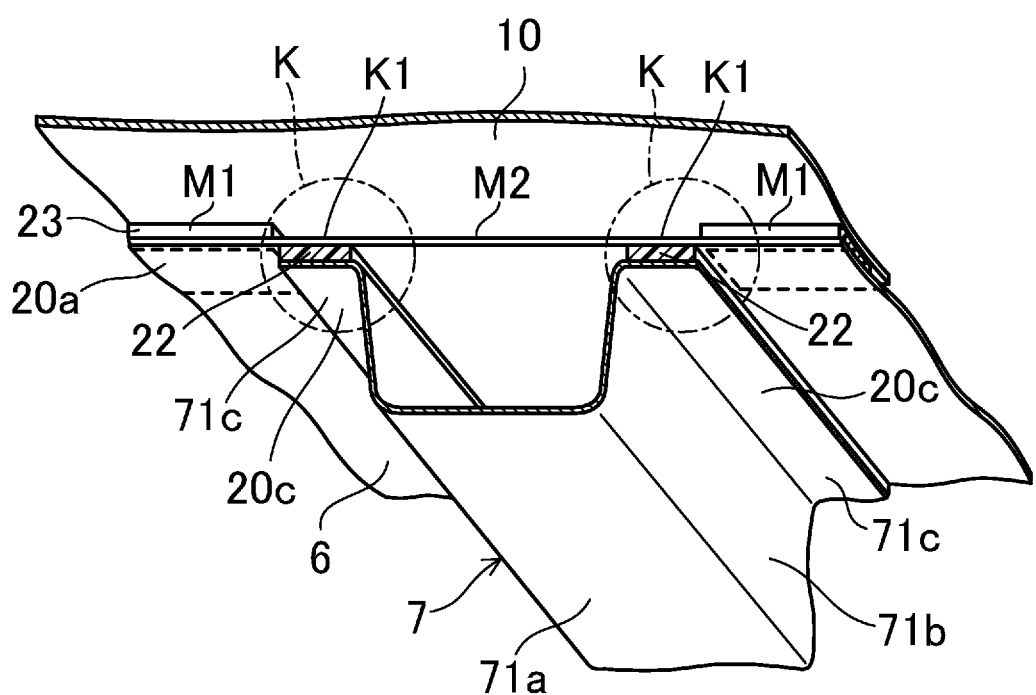
FIG. 15 is a partially sectional perspective view along the B1-B1 line in FIG. 14.

Specifically, as illustrated in FIG. 14 and FIG. 15, in addition to the second panel adjacent parts M2, the adhesive amount is made smaller also in the panel crossing part K1.

In the part of the second joining part 20c positioned at the panel stacking part K, the second adhesive 22 is placed, in which the adhesive amount per unit area of the panel adhesive 23 in the panel crossing part K1 of the e panel stacking part K is also made smaller than that in the first panel adjacent part M1, whereby the adhesiveness between the front panel 10 and the floor panel 6 in the panel crossing part K1 can be reduced. This reduces rigidity in the panel crossing part K1 and further substantially prevents rigidity fluctuations along the frame 7 in the vehicle fore-and-aft direction. Thus, the continuity of rigidity along the frame 7 in the vehicle fore-and-aft direction can be maintained, the reduction in vibration damping performance in the specific frequency band can be substantially prevented, vibration transmission in the entrances of vibration to the floor panel 6 can be substantially prevented, and vibration transmission from the frame 7 to the floor panel 6 can be substantially prevented. Consequently, joining parts with high rigidity and high damping performance can be brought about, and comfort can be improved while ensuring body strength.

As to the adhesive amount per unit area of the panel adhesive 23, on the basis of the idea on the adhesive amount in the second adjacent part R2, the adhesive amount in the panel crossing part K1 can be preferably 50% or less, more preferably 40% or less, and further preferably 30% or less of the adhesive amount in the first panel adjacent part M1. In a particularly preferred aspect, the adhesive amount in the panel crossing part K1 may be zero.

A plurality of panel crossing parts K1 can be formed within one body 1; the adhesive amounts of all the panel crossing parts K1 are not necessarily the same, and the adhesive amounts can be increased or decreased as appropriate depending on the position of the panel crossing parts K1.

Figure 16:
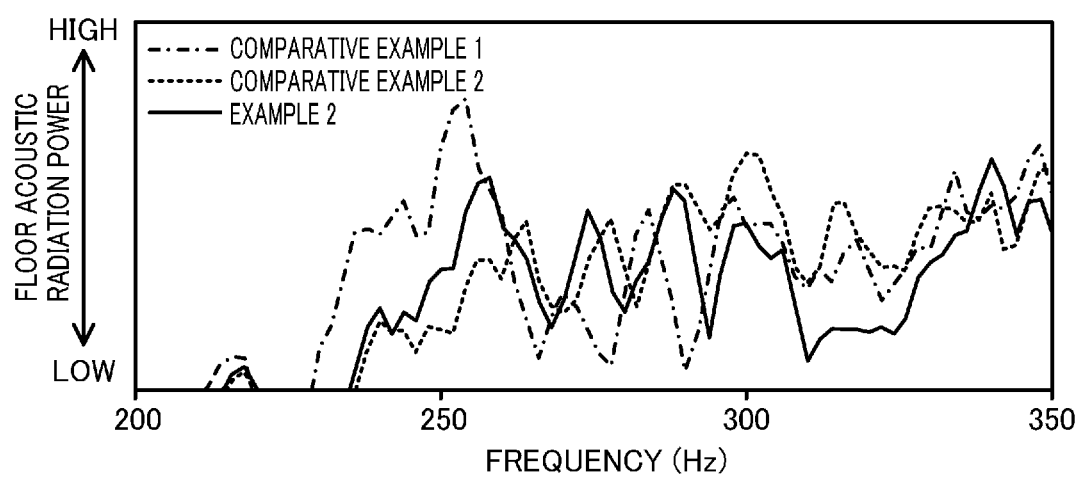
FIG. 16 is s diagram corresponding to FIG. 9A of the configuration according to the fourth embodiment.

Example 2 illustrated in FIG. 16 is a diagram corresponding to FIG. 9A when the adhesive amount per unit area of the panel adhesive 23 and the first adhesive 21 is zero in all the second panel adjacent parts M2, the panel crossing parts K1, the second adjacent parts R2, and the crossing parts Q1 illustrated in FIG. 2. Comparative Example 1 and Comparative Example 2 are the same as those in FIG. 9A.

As illustrated in FIG. 16, it is revealed that in the configuration of Example 2 a lower value in floor acoustic radiation power is shown than that of Comparative Example 1 near a frequency band of 300 Hz. It is revealed that floor acoustic radiation power significantly reduces compared with Comparative Examples 1 and 2 near a frequency band of 315 Hz. Near a frequency band of 260 Hz, a small amount of increase is shown compared with Comparative Example 2, still showing a reduction compared with Comparative Example 1. Near the frequency band of 260 Hz, Example 1 in FIG. 9A is lower than Example 2 in FIG. 16, giving a value comparable to that of Comparative Example 2.

Thus, the first adhesive 21 and the panel adhesive 23 are not placed in the second adjacent part R2, the crossing part Q1, the second panel adjacent part M2, and the panel crossing part K1 at all, whereby high damping performance in the joining part 20 can be ensured, and vibration transmission to the floor panel 6 can be substantially prevented.

Fifth Embodiment

Although in the first to fourth embodiments the adhesive amount per unit area of the first adhesive 21 is adjusted, an adhesive amount per unit area of the second adhesive 22 may be adjusted.

Stacking Part

Figure 17:
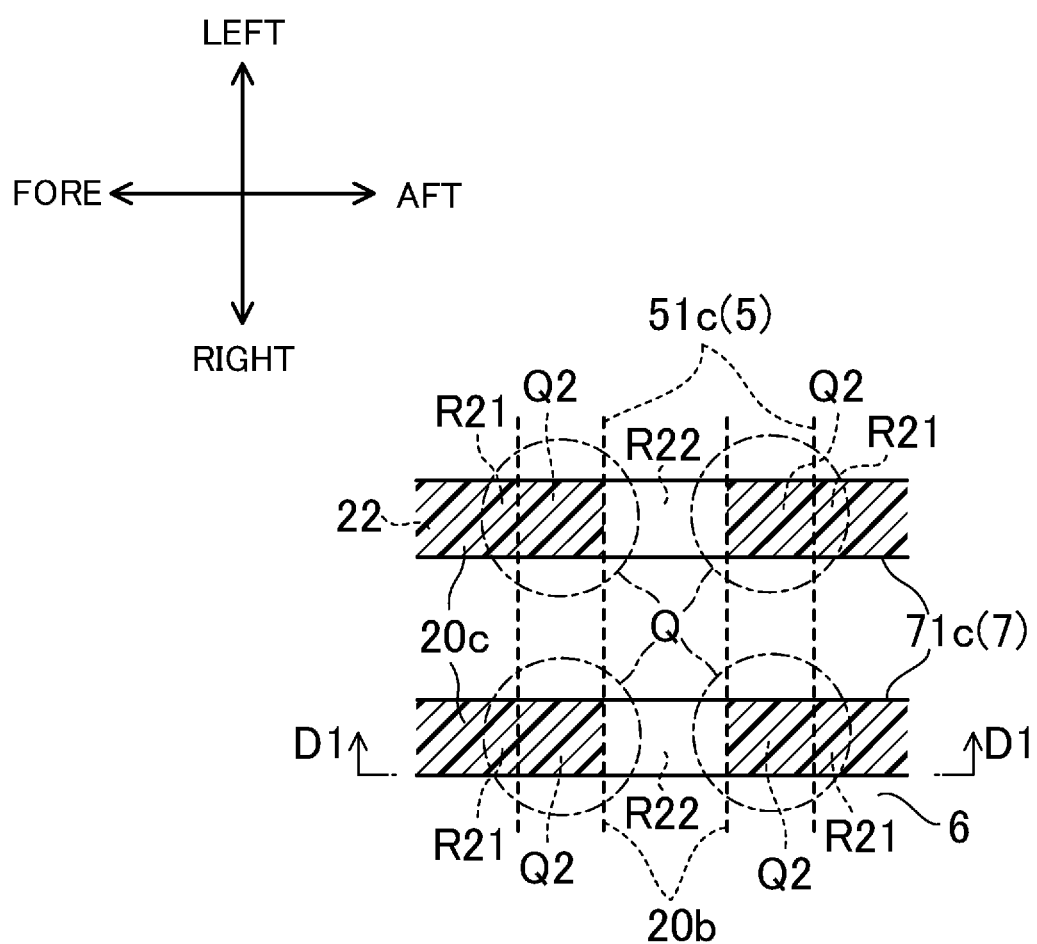
FIG. 17 is a schematic enlarged view of the part indicated by the symbol A2 in FIG. 2 of a body structure according to a fifth embodiment.
Figure 18:
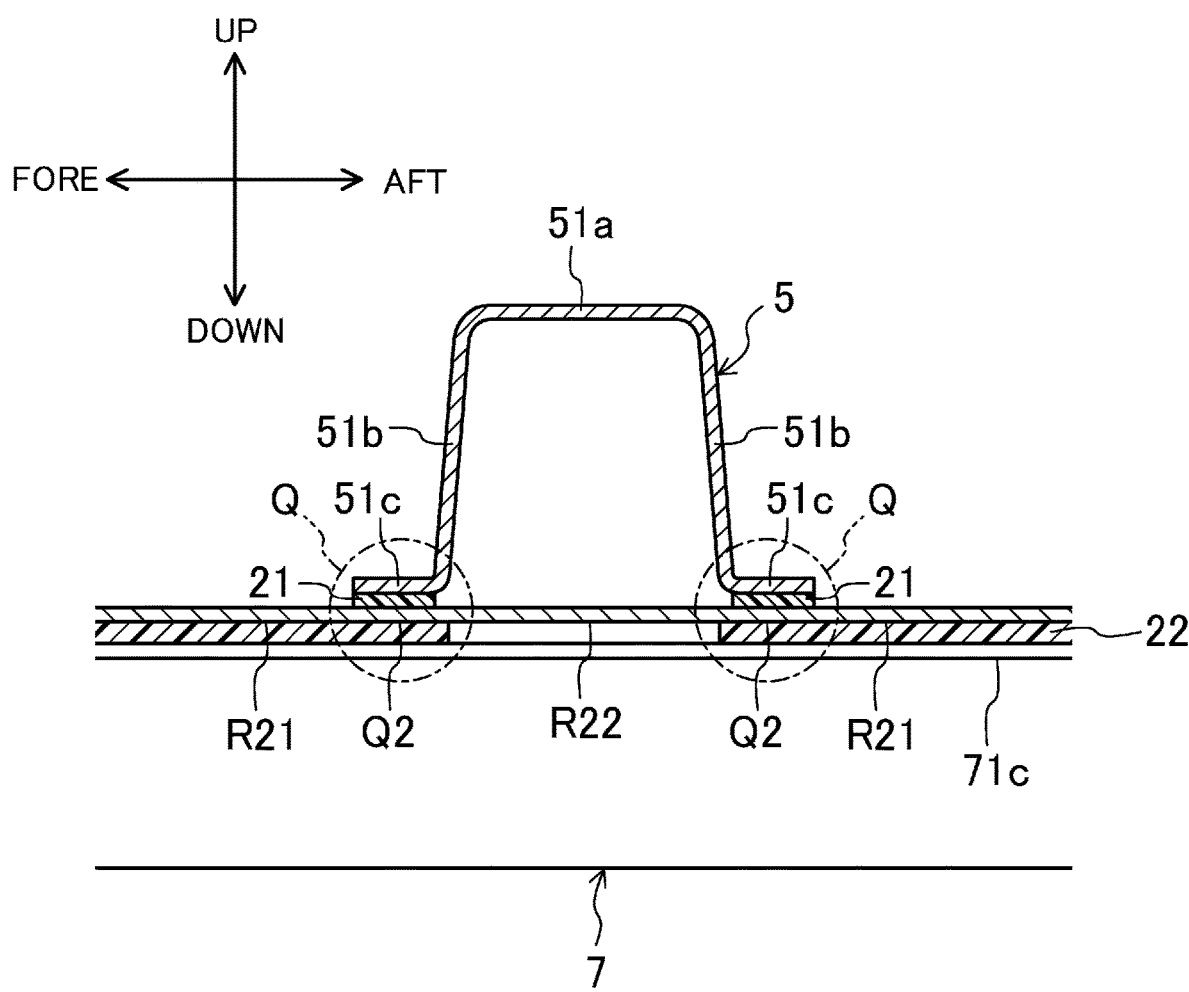
FIG. 18 is a sectional view along the D1-D1 line in FIG. 17.

On the assumption that the body 1 illustrated in FIG. 2 has a body structure according to a fifth embodiment, FIG. 17 illustrates a schematically enlarged view of the part indicated by the symbol A2 in FIG. 2. In FIG. 17, the second adhesive 22 is hatched for understanding, and the first adhesive 21 is not illustrated for the sake of simplicity. FIG. 18 is a sectional view along the D1-D1 line in FIG. 17

As illustrated in FIG. 17 and FIG. 18 parts in which the cross member 5, the floor panel 6, and the frame 7 overlap with each other in the up-and-down direction form the stacking parts Q in which the flange parts 51c and 51c of the cross member main body 51, the floor panel 6, and the frame flange parts 71c and 71c of the frame main body 71 overlap with each other in the up-and-down direction. In other words, the stacking parts Q are each a part in which the first joining part 20b and the second joining part 20c overlap with each other.

The second joining part 20c includes a second joining part crossing part Q2 that overlaps with the first joining part 20b to form the stacking part Q and a non-stacking adjacent part R21 and a stacking adjacent part R22 as second joining part adjacent parts that are adjacent to this second joining part crossing part Q2 and do not overlap with the first joining part 20b (hereinafter, the non-stacking adjacent part R21 and the stacking adjacent part R22 may be referred to as "second joining part adjacent parts R21 and R22").

The non-stacking adjacent part R21 is a part in which the cross member 5 is not placed on the upside of the floor panel 6. The stacking adjacent part R22 is a part in which the main wall part 51a and the pair of side wall parts 51b and 51b of the cross member 5 are placed on the upside of the floor panel 6 and can be said to be the second joining part 20c positioned at a part of the floor panel 6 forming the closed section structure in conjunction with the main wall part 51a and the pair of side wall parts 51b and 51b.

As illustrated in FIG. 3, in the first joining part 20b, the first adhesive 21 is placed continuously along the extension direction of the first joining part 20b. For the manner of the placement of the first adhesive 21, the configurations of the first to fourth embodiments may be employed.

In the second joining part 20c, as illustrated in FIG. 4, the second adhesive 22 is placed continuously along the extension direction of the second joining part 20c in parts other than the second joining part crossing part Q2.

As illustrated in FIG. 17 and FIG. 18, in the body structure according to the present embodiment, an adhesive amount per unit area of the second adhesive 22 in the stacking adjacent part R22 is smaller than an adhesive amount per unit area of the second adhesive 22 in the non-stacking adjacent part R21.

FIG. 28 and FIG. 29 illustrate a state when the second adhesive 22 is placed across the entire second joining part 20c including the stacking adjacent part R22. In other words, the second adhesive 22 is placed continuously and uniformly also in the stacking adjacent part R22 of the stacking part Q in FIG. 18 similarly to the non-stacking adjacent part R21.

When the second adhesive 22 is thus placed uniformly across the entire second joining parts 20c, because of the first adhesive 21 being placed in the part of the first joining part 20b positioned at the stacking part Q, rigidity in the vehicle fore-and-aft direction tends to extremely increase in the stacking part Q, and damping performance in the stacking part Q can be reduced.

The floor panel 6 positioned at the stacking adjacent part R22 forms the closed section structure in conjunction with the cross member 5, and when the second adhesive 22 is placed in the stacking adjacent part R22, rigidity increases from the stacking part Q toward the stacking adjacent part R22, and in terms of the vehicle fore-and-aft direction, vibration transmitted through the frame 7 is easily transmitted to the floor panel 6 and the cross member 5 via the stacking part Q and the stacking adjacent part R22, for example.

In contrast, as illustrated in FIG. 17 and FIG. 18, the configuration of the present embodiment makes the adhesive amount per unit area of the second adhesive 22 in the stacking adjacent part R22 smaller than that in the non-stacking adjacent part R21 and can thereby reduce the adhesiveness between the frame flange part 71c and the floor panel 6 in the stacking adjacent part R22. This can substantially prevent an extreme increase in rigidity in the stacking adjacent part R22 forming the closed section structure to substantially prevent the reduction in damping performance and can thus substantially prevent vibration transmission from the frame 7 to the floor panel 6 and the cross member 5 in the closed section structure. Consequently, comfort can be improved while ensuring body strength.

As to the adhesive amount per unit area of the second adhesive 22, the adhesive amount in the stacking adjacent part R22 can be preferably 50% or less, more preferably 40% or less, and further preferably 30% or less of the adhesive amount in the non-stacking adjacent part R21. In a particularly preferred aspect, the adhesive amount in the stacking adjacent part R22 may be zero as described below.

In the configuration of the fifth embodiment, "the adhesive amount per unit area" refers to an adhesive amount per unit area at any place of the stacking adjacent part R22, for example, and also includes the average of an adhesive amount per unit area in the entire one stacking adjacent part R22 out of the two stacking adjacent parts R22 illustrated in FIG. 17 and FIG. 18 for example. Specifically, not only a case in which the adhesive is uniformly applied in one stacking adjacent part R22, for example, but also a case is included in which the adhesive is applied in a dot shape, for example, to locally give a place in which the adhesive amount per unit area is larger and a place in which it is smaller, but the average of the entire one stacking adjacent part R22 satisfies the range of the adhesive amount described above. When the average value is referred to for the adhesive amount per unit area in the non-stacking adjacent part R21, the average of the adhesive amount per unit area of a part having an area equal to the area of the second joining part crossing part Q2 at a place adjacent to the second joining part crossing part Q2 is referred to.

A plurality of stacking adjacent parts R22 can be formed within one body 1; the adhesive amounts of all the stacking adjacent parts R22 are not necessarily the same, and the adhesive amounts can be increased or decreased as appropriate depending on the position of the stacking adjacent parts R22.

Specifically, as illustrated in FIG. 2, a plurality of (two in the present embodiment) cross members 5 are provided spaced apart from each other in the vehicle fore-and-aft direction, and the staking parts Q are also formed at a plurality of places. Consequently, the stacking adjacent parts R22 are also present at a plurality of places.

Referring to FIG. 8, making the adhesive amount per unit area of the second adhesive 22 in one stacking adjacent part R22 close to the position of the amplitude loop smaller than the adhesive amount per unit area of the second adhesive 22 in another stacking adjacent part R22 far from the position of the amplitude loop is effective in view of substantially preventing vibration transmission. Specifically, in one preferred embodiment, the adhesive amount per unit area of the second adhesive 22 in the stacking adjacent part R22 formed in the second joining part 20c of the cross member 5 close to the position indicated by the symbol T3 in FIG. 8 is made smaller than the adhesive amount per unit area of the second adhesive 22 in the stacking adjacent part R22 formed in the second joining part 20c close to the position indicated by the symbol T2, for example.

The front side and the rear side of the floor panel 6 can be input sources of vibration transmitted from an engine, suspensions, and the like (not illustrated) to the floor panel 6 via the front panel 10, the rear panel 11, and the frame 7. This can make it difficult to ensure damping performance when the joining part 20 positioned on the front side and the rear side is extremely high in rigidity.

Given these circumstances, the adhesive amount per unit area of the second adhesive 22 in the stacking adjacent part R22 positioned on both sides in the fore-and-aft direction of the floor panel 6, that is, the front side and the rear side thereof may be set to be smaller than the adhesive amount per unit area of the second adhesive 22 in the stacking adjacent part R22 positioned around the center of the floor panel 6. This setting can effectively substantially prevent vibration transmission and can improve comfort while ensuring body strength.

In one preferred embodiment, in view of substantially preventing vibration transmission from the frame 7 to the floor panel 6 and the cross member 5 and achieving both high rigidity and high damping performance, as illustrated in FIG. 18 in particular, the second adhesive 22 is not placed in the stacking adjacent part R22 at all.

Figure 19:
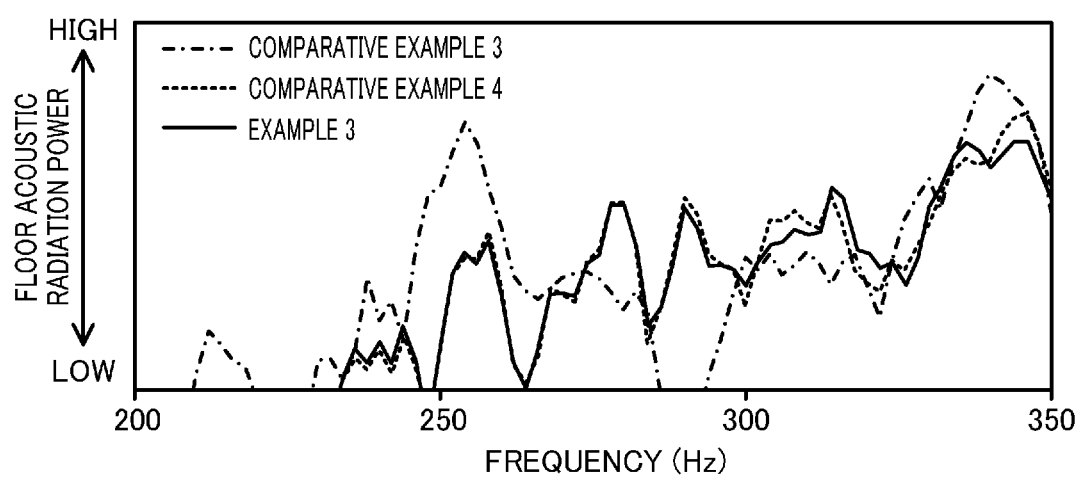
FIG. 19 is a graph indicating the frequency dependence of acoustic radiation power of the floor panel when vibration is input from the rear panel in the configurations of Example 3 and Comparative Examples 3 and 4.

FIG. 19 is a result obtained by calculating floor acoustic radiation power versus frequency using CAE analysis for vibration transmitted to the floor panel 6 when vibration input from the rear panel 11 is assumed in the configuration illustrated in FIG. 2.

In FIG. 19, Comparative Example 3 indicated by the dashed-dotted curve is a result when the first adhesive 21 and the second adhesive 22 are not placed in the first joining part 20b and the second joining part 20c; Comparative Examples 4 indicated by the broken curve is a result when the first adhesive 21 and the second adhesive 22 are uniformly placed across the entire first joining part 20b and second joining part 20c as illustrated in FIG. 28 and FIG. 29; and Example 3 indicated by the solid curve is a result when the adhesive amount of the second adhesive 22 in all the stacking adjacent parts R22 is zero as illustrated in FIG. 17 and FIG. 18.

As illustrated in FIG. 19, it is revealed that near a frequency band of 245 Hz to 270 Hz, floor acoustic radiation power significantly reduces, and vibration transmitted to the floor panel 6 is reduced from Comparative Example 3 to Comparative Example 4. In contrast, it is revealed that near a frequency band of 310 Hz, floor acoustic radiation power increases, and vibration transmitted to the floor panel 6 conversely increases in Comparative Example 4 compared with Comparative Example 3. It is revealed that in Example 3 the increase in floor acoustic radiation power near the frequency band of 310 Hz is substantially prevented compared with Comparative Example 4.

The second adhesive 22 is thus not placed in the stacking adjacent part R22 at all, whereby damping performance in the joining part 20 can be ensured, and vibration transmission to the floor panel 6 can be substantially prevented.

Although the method for joining the joining part 20 employs use of the adhesive, so long as the second adhesive 22 is used for the joining of the second joining part 20c, a method of joining other than the adhesive may be used for the other joining part 20; specifically, for the joining of the first joining part 20b, spot welding or joining by a mechanical jointer alone may be used in place of joining with the first adhesive 21, for example. In other words, the configuration according to the present embodiment can be widely applied regardless of the method for joining the joining part 20 other than the second joining part 20c.

Sixth Embodiment

Although in the fifth embodiment as to the adhesive amount of the second adhesive 22, the adhesive amount in the stacking adjacent part R22 is made smaller than the adhesive amount in the non-stacking adjacent part R21, the adhesive amount in the second joining part crossing part Q2 may also be smaller than the adhesive amount in the non-stacking adjacent part R21.

Figure 20:
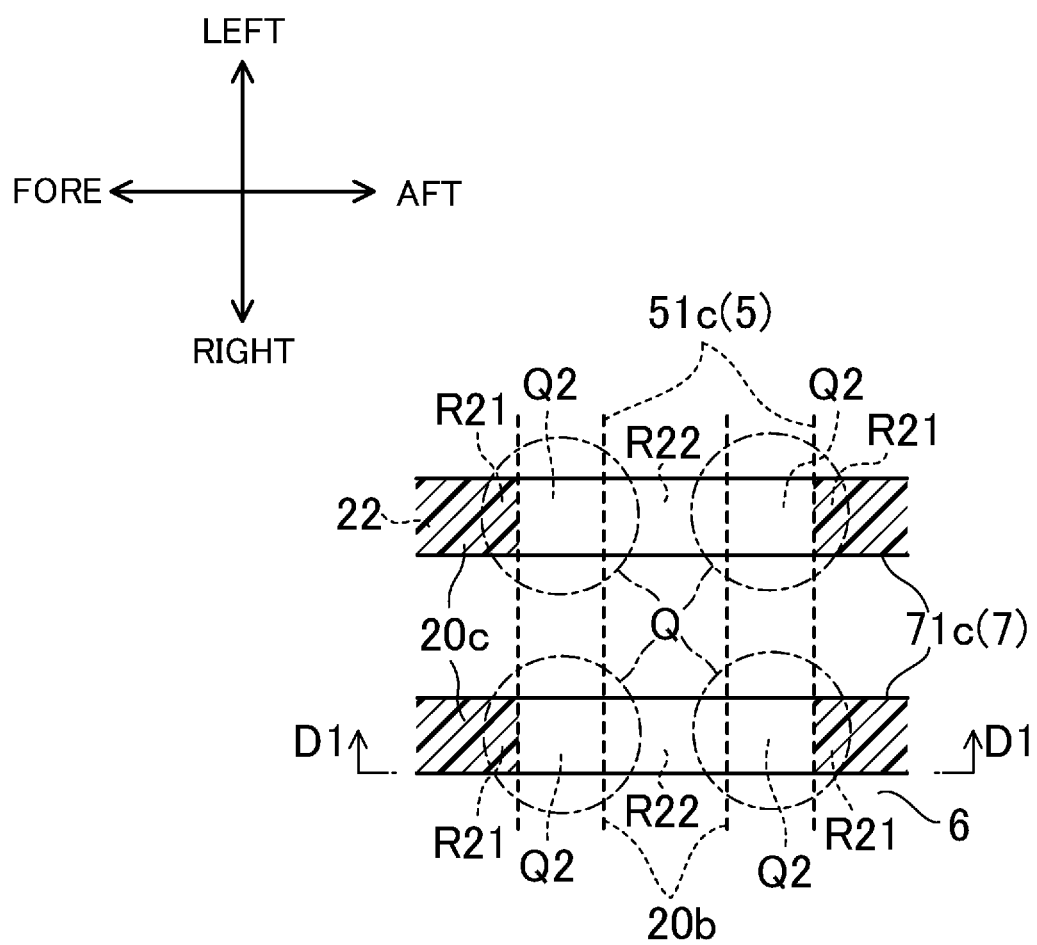
FIG. 20 is a diagram corresponding to FIG. 17 of a configuration according to a sixth embodiment.
Figure 21:
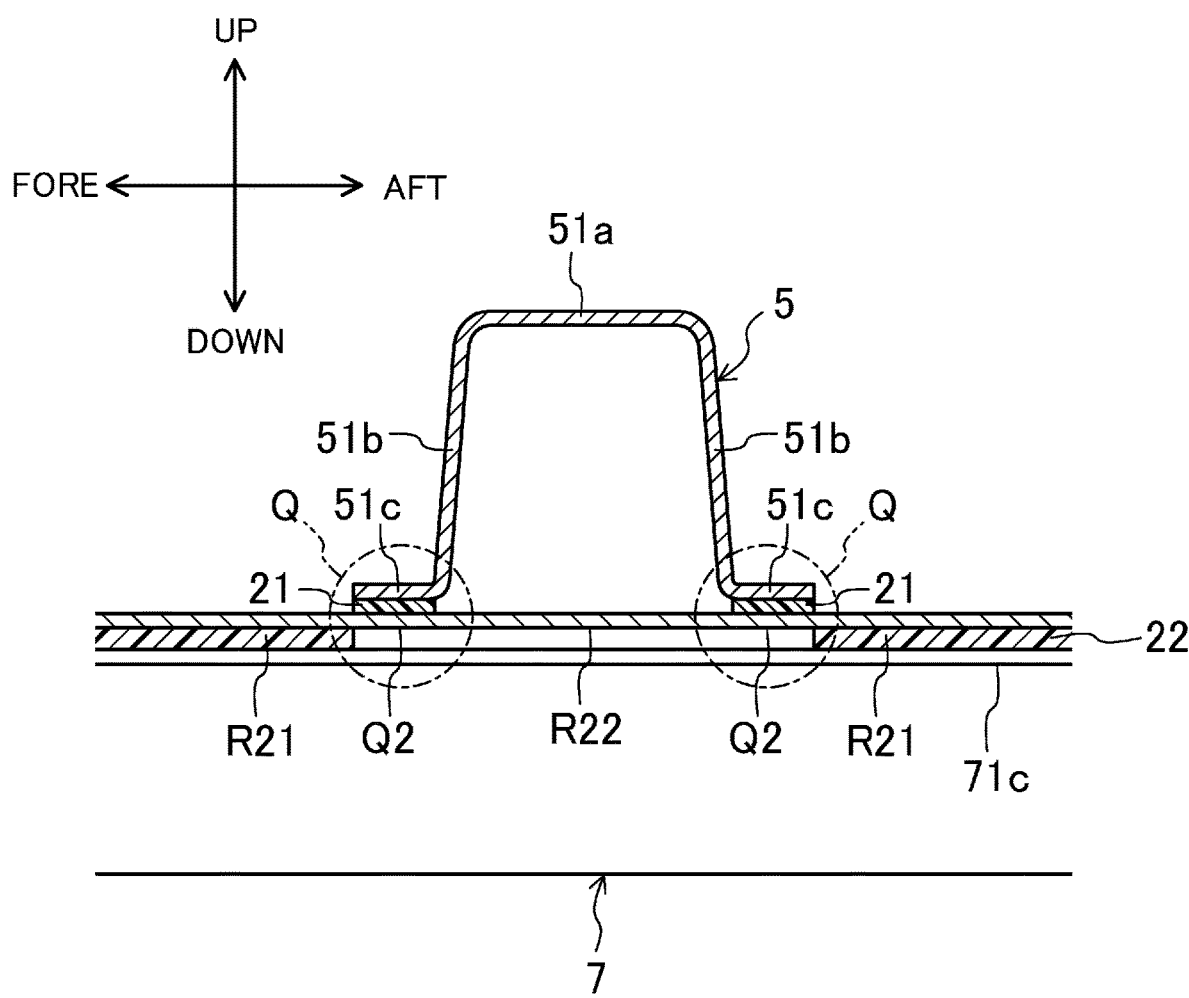
FIG. 21 is a sectional view along the D1-D1 line in FIG. 20.

Specifically, as illustrated in FIG. 20 and FIG. 21, in addition to the stacking adjacent parts R22, the adhesive amount is made smaller also in the second joining part crossing part Q2.

In the part of the second joining part 20c positioned at the stacking part Q, that is, the second joining part crossing part Q2, the second adhesive 22 is placed, in which the adhesive amount per unit area of the second adhesive 22 in the second joining part crossing part Q2 of the stacking part Q is made smaller than that in the non-stacking adjacent part R21, whereby the adhesiveness between the flange part 51c and the floor panel 6 in the second joining part crossing part Q2 can be reduced. This reduces rigidity in the second joining part crossing part Q2, can substantially prevent a reduction in damping performance of the stacking part Q, and can thus effectively substantially prevent vibration transmission from the frame 7 to the floor panel 6 and the cross member 5. Consequently, comfort can be improved while ensuring body strength.

As to the adhesive amount per unit area of the second adhesive 22, on the basis of the idea on the adhesive amount in the stacking adjacent part R22, the adhesive amount in the second joining part crossing part Q2 can be preferably 50% or less, more preferably 40% or less, and further preferably 30% or less of the adhesive amount in the non-stacking adjacent part R21. In a particularly preferred aspect, the adhesive amount in the second joining part crossing part Q2 may be zero.

A plurality of second joining part crossing parts Q2 can be formed within one body 1; the adhesive amounts of all the second joining part crossing parts Q2 are not necessarily the same, and the adhesive amounts can be increased or decreased as appropriate depending on the position of the second joining part crossing parts Q2.

Specifically, as illustrated in FIG. 8, as described above, making the adhesive amount per unit area of the second adhesive 22 in one second joining part crossing parts Q2 close to the position of the amplitude loop smaller than the adhesive amount per unit area of the second adhesive 22 in another second joining part crossing parts Q2 far from the position of the amplitude loop is effective in view of substantially preventing vibration transmission.

The front side and the rear side of the floor panel 6 can be input sources of vibration transmitted from an engine, wheels, and the like (not illustrated) to the floor panel 6 via the front panel 10, the rear panel 11, and the frame 7. Given these circumstances, as described above, the adhesive amount per unit area of the second adhesive 22 in the second joining part crossing part Q2 positioned on the front side and the rear side of the floor panel 6 may be set to be smaller than the adhesive amount per unit area of the second adhesive 22 in the second joining part crossing part Q2 positioned around the center of the floor panel 6. This can effectively substantially prevent vibration transmission and can improve comfort while ensuring body strength.

In one preferred embodiment, in view of substantially preventing vibration transmission from the frame 7 to the floor panel 6 and the cross member 5 and achieving both high rigidity and high damping performance, as illustrated in FIG. 21 in particular, the second adhesive 22 is not placed in the stacking adjacent part R22 and the second joining part crossing part Q2 at all.

Figure 22:
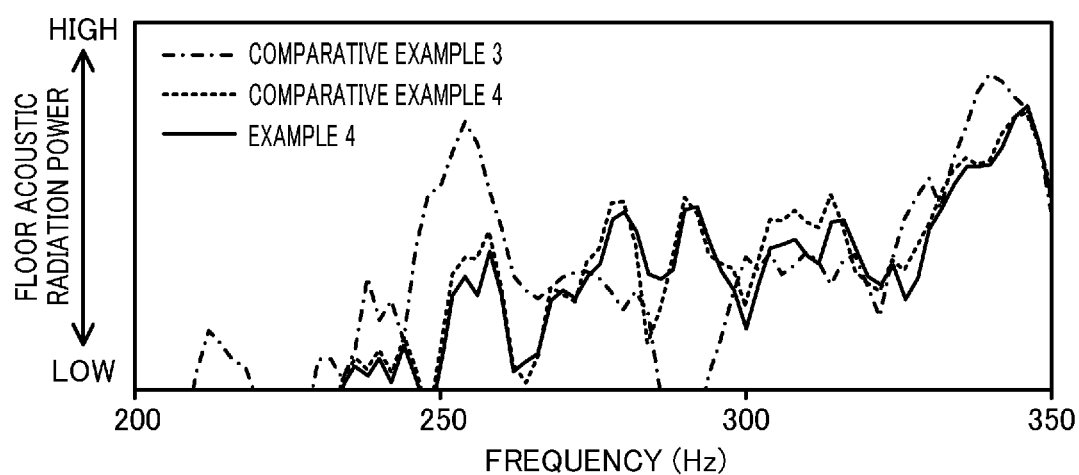
FIG. 22 is a diagram corresponding to FIG. 19 of the configuration of Example 4 and Comparative Examples 3 and 4.

FIG. 22 is a diagram corresponding to FIG. 19 about a body structure according to the sixth embodiment. Specifically, in FIG. 22, Comparative Examples 3 and 4 are the same results as those in FIG. 19. Example 4 indicated by the solid curve is a result when the adhesive amount of the second adhesive 22 in all the stacking adjacent parts R22 and second joining part crossing parts Q2 is zero as illustrated in FIG. 20 and FIG. 21.

As illustrated in FIG. 22, it is revealed that in Example 4 floor acoustic radiation power near a frequency band of 260 Hz further reduces, and high damping performance is ensured compared with Comparative Example 4. It is revealed that the increase in floor acoustic radiation power near 310 Hz is clearly substantially prevented compared with Comparative Example 4. It is thus revealed that the adhesive amount of the second adhesive 22 in all the second joining part crossing parts Q2 is made zero in addition to all the stacking adjacent parts R22, whereby high damping performance of the joining part 20 can be ensured, and vibration transmission can be effectively substantially prevented.

Seventh Embodiment

Although in the embodiments the body forming members in the first joining part 20b, the second joining part 20c, and the panel joining part 20a are joined to each other with the adhesive, the joining part 20 including these joining parts may be a structure with a combined use of joining with an adhesive and spot welding and/or a mechanical jointer.

Figure 23:
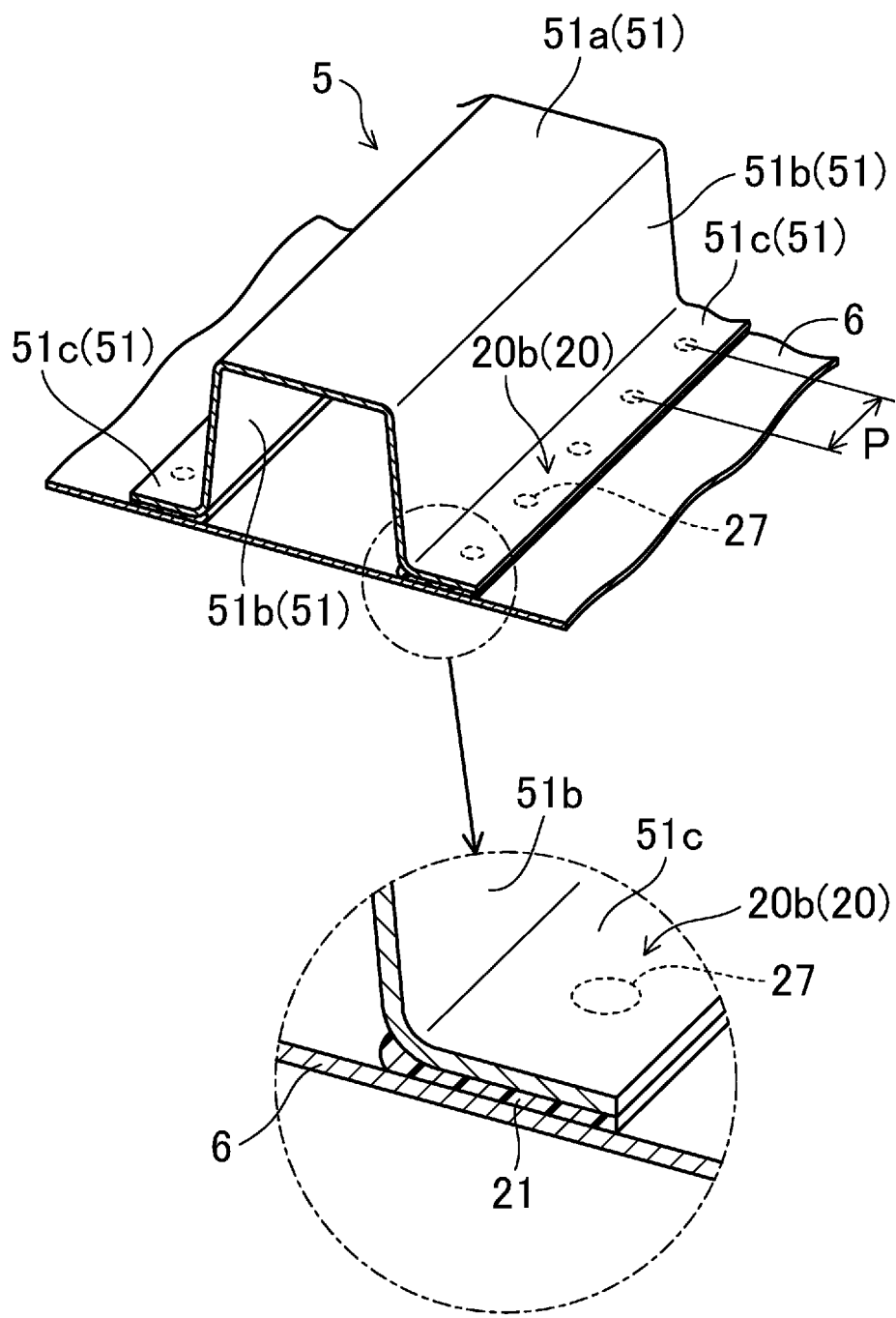
FIG. 23 is a diagram corresponding to FIG. 3 of a body structure according to a seventh embodiment.
Figure 24:
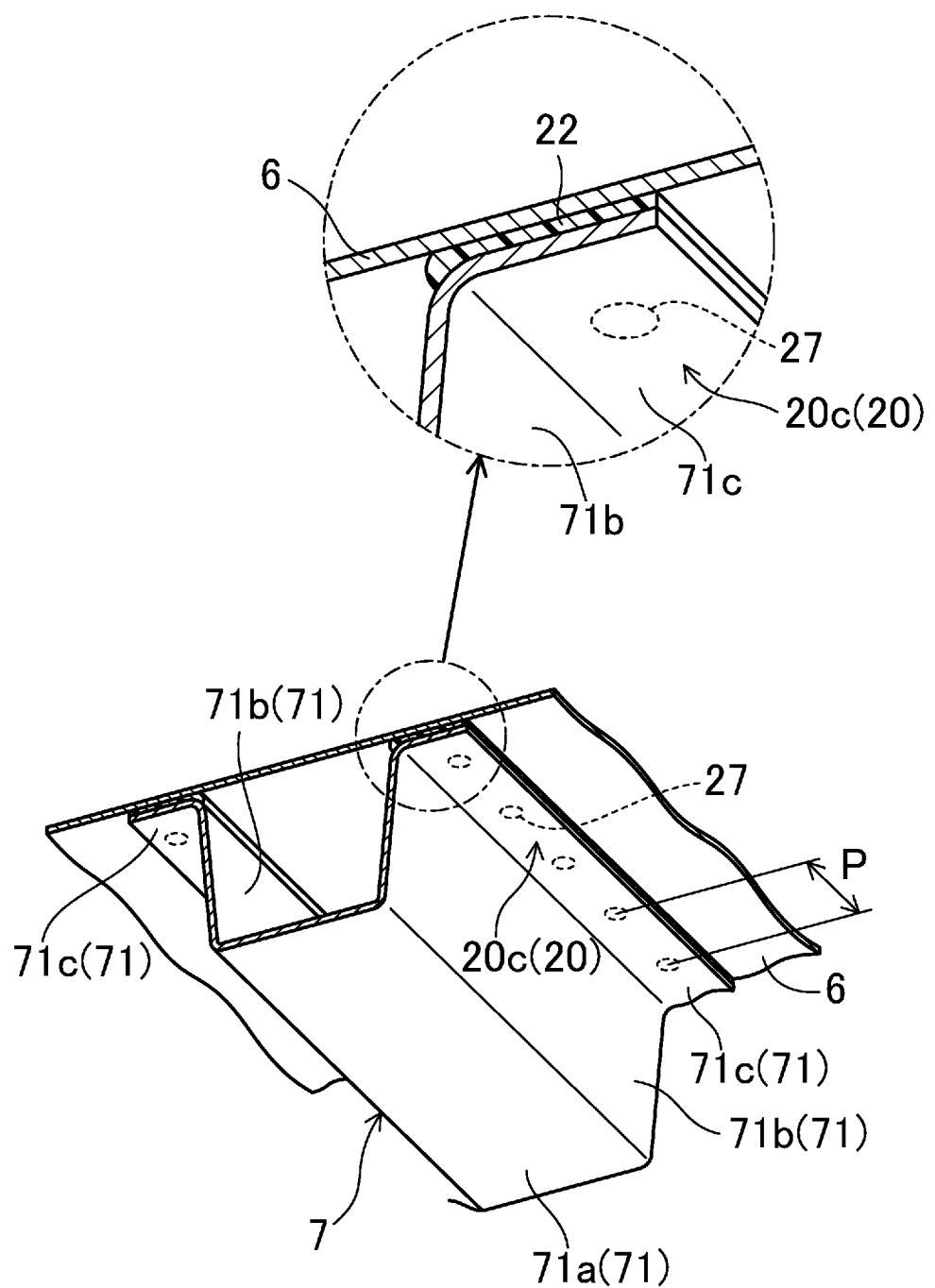
FIG. 24 is a diagram corresponding to FIG. 4 of the body structure according to the seventh embodiment.
Figure 25:
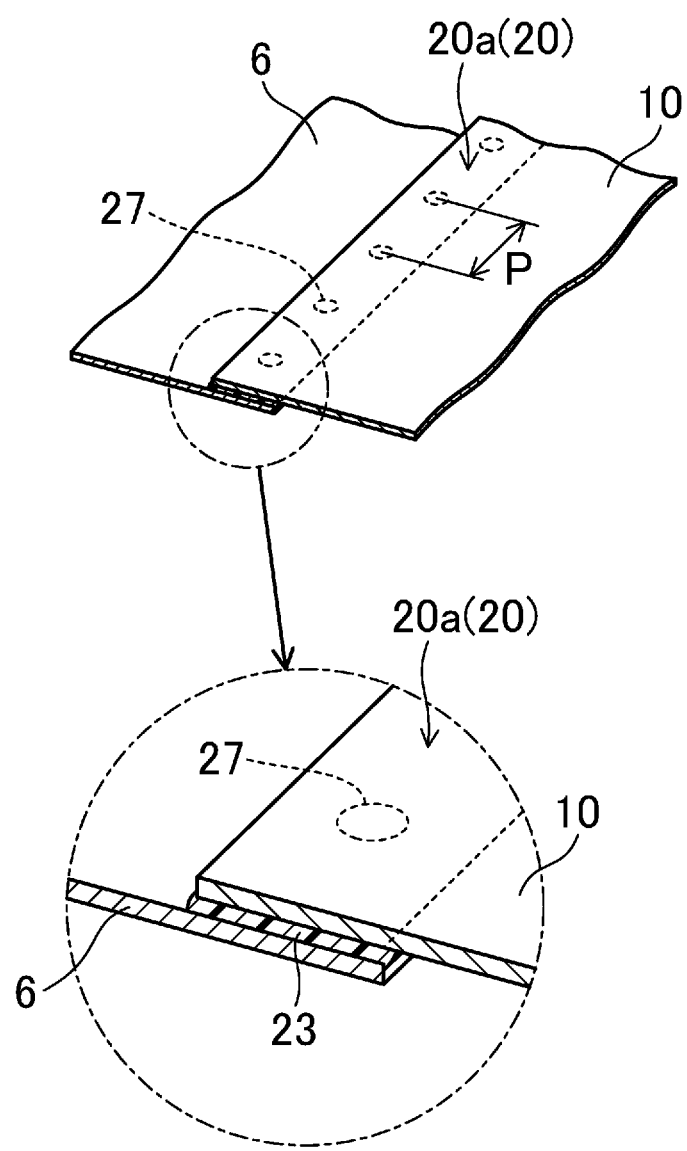
FIG. 25 is a diagram corresponding to FIG. 5 of the body structure according to the seventh embodiment.

Specifically, as illustrated in FIG. 23, the first joining part 20b may include a plurality of spot joining parts 27 that are arranged spaced apart from each other in the extension direction of the flange parts 51c and 51c of the cross member 5 and are formed by causing both the flange parts 51c and 51c of the cross member 5 and the floor panel 6 to be partially welded to each other. As illustrated in FIG. 24 and FIG. 25, similarly to the first joining part 20b, the spot joining parts 27 described above may be included also in the second joining part 20c and the panel joining part 20a.

The structure with a combined use of the adhesive and the spot joining parts 27 is what is called weld bond joining. Such weld bond joining is employed for the joining part 20, whereby the loss factor can be significantly increased while ensuring high rigidity, and improvement in riding characteristics and noise reduction can be easily achieved.

The spot joining parts 27 as a partial joining structure in weld bond joining may be formed by welding (that is, spot welding) as described above or, not limited to spot welding, may be a mechanical jointer such as self-piercing rivets (SPR), so long as they are point-shaped joining structures. In consideration of placement within the body 1, required rigidity and damping performance, and the like, the joining part 20 may be formed by combining the adhesive alone, a structure with a combined use of the adhesive and spot welding, and a structure with a combined use of the adhesive and a mechanical jointer as appropriate.

To stably achieve both the high rigidity and the high damping performance of the vehicle 1, as illustrated in FIG. 23 to FIG. 25, a spacing P of the spot joining parts 27 is preferably set to be within a range of 10 mm to 100 mm, more preferably set to be within a range of 15 mm to 70 mm, and even more preferably set to be within a range of 25 mm to 50 mm.

When the spacing P between the spot joining parts 27 is extremely small, the influence of rigidity by joining increases, and a vibration damping effect of an adhering part including the adhesive and the spot joining parts 27 is hindered. When the spacing P between the spot joining parts 27 is extremely large, the influence of rigidity by joining reduces, a burden on the adhering part increases, and rigidity as the entire joining part 20 may reduce.

In contrast, the spacing P of the spot joining parts 27 is set to be the range, whereby the adhesive having rigidity and damping performance and the spot joining parts 27 excellent in rigidity moderately complement each other, and both the high rigidity and high damping performance of the body 1 can be stably achieved.

Other Embodiments

The disclosed technique is not limited to the embodiments and also includes various other configurations.

The adhesive is not necessarily provided along the edge part of the joining part 20, for example. When protrusion of the adhesive from the edge part of the joining part 20 is unfavorable in view of ensuring good-looking appearance or the like, the adhesive can be provided so as to be positioned at the inner part of the edge part of joining. The present disclosed technique is not limited to the joining parts of the body forming members such as the cross member 5, the floor panel 6, the frame 7, the front panel 10, and the rear panel 11 and can also be applied to other joining parts forming the body.

The present disclosure is extremely useful in the field of a vehicle body structure.

What is claimed is:

1. A vehicle body structure, comprising:
a panel member forming a body;
a first rigid member joined to one face of the panel member via a first joining part and/or an additional panel member joined to the one face of the panel member via a panel joining part; and
a second rigid member joined to another face of the panel member via a second joining part, wherein
the first joining part includes a first adhesive, with damping performance, that adheres to, and joins together, both the first rigid member and the panel member,
the panel joining part includes a panel adhesive, with damping performance, that adheres to, and joins together, both the panel member and the additional panel member,
the second joining part includes a second adhesive, with damping performance, that adheres to, and joins together, both the second rigid member and the panel member,
the first joining part includes a crossing part that overlaps with the second joining part and an adjacent part that is adjacent to the crossing part and does not overlap with the second joining part,
the adjacent part includes a first adjacent part in which the second rigid member is not placed on the other face side of the panel member and a second adjacent part in which the second rigid member is placed,
the panel joining part includes a panel crossing part that overlaps with the second joining part and a panel adjacent part that is adjacent to the panel crossing part and does not overlap with the second joining part,
the panel adjacent part includes a first panel adjacent part in which the second rigid member is not placed on the other face side of the panel member and a second panel adjacent part in which the second rigid member is placed,
the second joining part includes a second joining part crossing part that overlaps with the first joining part and a second joining part adjacent part that is adjacent to the second joining part crossing part and does not overlap with the first joining part,
the second joining part adjacent part includes a non-stacking adjacent part in which the first rigid member is not placed on the one face side of the panel member and a stacking adjacent part in which the first rigid member is placed, and
at least one of the following (A), (B), and (C) is satisfied:
(A) an adhesive amount per unit area of the first adhesive in the second adjacent part is smaller than an adhesive amount per unit area of the first adhesive in the first adjacent part;
(B) an adhesive amount per unit area of the panel adhesive in the second panel adjacent part is smaller than an adhesive amount per unit area of the panel adhesive in the first panel adjacent part; and
(C) an adhesive amount per unit area of the second adhesive in the stacking adjacent part is smaller than an adhesive amount per unit area of the second adhesive in the non-stacking adjacent part.

2. The vehicle body structure of claim 1, wherein
the first adhesive, the panel adhesive, and the second adhesive have characteristics with a storage elastic modulus of within a range of 100 MPa to 800 MPa and a loss factor of 0.2 or more under conditions with a temperature of 20° C. and an exciting force frequency of 60 Hz.

3. The vehicle body structure of claim 1, wherein
the first rigid member is a long member,
the first joining part is formed so as to extend in a longitudinal direction of the first rigid member,
an adhesive amount per unit area of the first adhesive in the second adjacent part is smaller than an adhesive amount per unit area of the first adhesive in the first adjacent part, and
the first adhesive is placed continuously along an extension direction of the first joining part in parts other than the second adjacent part.

4. The vehicle body structure of claim 3, wherein
an adhesive amount per unit area of the first adhesive in the crossing part is smaller than an adhesive amount per unit area of the first adhesive in the first adjacent part.

5. The vehicle body structure of claim 1, wherein
the panel member and the additional panel member are joined to each other at respective end parts thereof,
the panel joining part is formed so as to extend along the end part of the panel member and the end part of the additional panel member;
an adhesive amount per unit area of the panel adhesive in the second panel adjacent part is smaller than an adhesive amount per unit area of the panel adhesive in the first panel adjacent part, and
the panel adhesive is placed continuously along an extension direction of the panel joining part in parts other than the second panel adjacent part.

6. The vehicle body structure of claim 5, wherein
an adhesive amount per unit area of the panel adhesive in the panel crossing part is smaller than the adhesive amount per unit area of the panel adhesive in the first panel adjacent part.

7. The vehicle body structure of claim 1, wherein
the second rigid member is a long member,
the second joining part is formed so as to extend in a longitudinal direction of the second rigid member,
an adhesive amount per unit area of the second adhesive in the stacking adjacent part is smaller than an adhesive amount per unit area of the second adhesive in the non-stacking adjacent area, and
the second adhesive is placed continuously along an extension direction of the second joining part in parts other than the second joining part crossing part.

8. The vehicle body structure of claim 1, wherein
an adhesive amount per unit area of the second adhesive in the stacking adjacent part is smaller than an adhesive amount per unit area of the second adhesive in the non-stacking adjacent area, and
an adhesive amount per unit area of the second adhesive in the second joining part crossing part is smaller than an adhesive amount per unit area of the second adhesive in the non-stacking adjacent area.

9. The vehicle body structure of claim 1, wherein
the first joining part and/or the second joining part each include a pair of facing joining parts arranged so as to face each other with a certain spacing therebetween,
a closed section structure is formed between the pair of facing joining parts, and the first adhesive and/or the second adhesive are provided along edge parts of the facing joining parts facing the inside of the closed section structure.

10. The vehicle body structure of claim 9, wherein the first rigid member and/or the second rigid member are each a long member with a hat-shaped cross section,
the first rigid member and/or the second rigid member each include a pair of flange parts provided substantially in parallel with each other so as to extend in their longitudinal directions at both ends in a width direction of the first rigid member and/or the second rigid member,
the pair of facing joining parts are joined to the panel member via the pair of flange parts, and
a closed section structure including the first rigid member and/or the second rigid member and the panel member is formed between the pair of facing joining parts.

11. The vehicle body structure of claim 1, wherein the panel member is a floor panel forming a vehicle cabin of the body,
the first rigid member is at least one cross member for reinforcing the floor panel,
the additional panel member is a front panel and/or a rear panel of the body, and
the second rigid member is a frame of the body.

12. The vehicle body structure of claim 11, wherein the frame is formed so as to extend in a vehicle fore-and-aft direction on the downside of the floor panel,
the at least one cross member is formed so as to cross the frame and extend in a vehicle width direction on the upside of the floor panel and includes a plurality of cross members provided spaced apart from each other in the vehicle fore-and-aft direction, and
an adhesive amount per unit area of the first adhesive in the crossing part positioned on both end sides in the vehicle fore-and-aft direction of the floor panel is smaller than an adhesive amount per unit area of the first adhesive in the crossing part positioned around the center in the vehicle fore-and-aft direction of the floor panel.

13. The vehicle body structure of claim 11, wherein the frame is formed so as to extend in a vehicle fore-and-aft direction on the downside of the floor panel,
the at least one cross member is formed so as to cross the frame and extend in a vehicle width direction on the upside of the floor panel and includes a plurality of cross members provided spaced apart from each other in the vehicle fore-and-aft direction, and
when an external force is exerted on the floor panel from a fore side and/or an aft side, an adhesive amount per unit area of the first adhesive in the crossing part close to a position of an amplitude loop of vibration in the vehicle fore-and-aft direction transmitted to the floor panel is smaller than an adhesive amount per unit area of the first adhesive in the crossing part far from the position of the amplitude loop.

14. The vehicle body structure of claim 11, wherein the panel joining part is formed so as to extend in a vehicle width direction, and
the frame is joined to the floor panel to extend in the vehicle fore-and-aft direction and is joined to the front panel and/or the rear panel on the fore side or the aft side of the panel joining part.

15. The vehicle body structure of claim 1, wherein at least one of the first joining part, the panel joining part, and the second joining part is a structure with a combined use with spot welding and/or a mechanical jointer.

16. The vehicle body structure of claim 15, wherein the first rigid member and/or the second rigid member are each a long member, and
the first joining part and/or the second joining part each include a plurality of spot joining parts that are arranged spaced apart from each other in an extension direction of the first rigid member and/or the second rigid member and are formed by causing both the first rigid member and/or the second rigid member and the panel member to be partially welded to each other in addition to joining with the first adhesive and/or the second adhesive.

17. The vehicle body structure of claim 16, wherein a spacing between the spot joining parts is set to be within a range of 10 mm to 100 mm.

18. The vehicle body structure of claim 15, wherein the panel joining part is formed so as to extend in a vehicle width direction,
the second rigid member is a long member, and
the panel joining part and/or the second joining part each include a plurality of spot joining parts that are arranged spaced apart from each other in an extension direction of the panel joining part and/or the second rigid member and are formed by causing both the additional panel member and/or the second rigid member and the panel member to be partially welded to each other in addition to joining with the panel adhesive and/or the second adhesive.

19. The vehicle body structure of claim 1, wherein at least one of the panel member and/or the first rigid member in the first joining part, the panel member and/or the additional panel member in the panel joining part, and the panel member and/or the second rigid member in the second joining part has a thickness of less than 2 mm.

20. A vehicle body structure, comprising:
a panel member forming a body;
a first rigid member joined to one face of the panel member via a first joining part; and
a second rigid member joined to another face of the panel member via a second joining part,
wherein
the second joining part includes a damping adhesive that adheres to, and joins together, both the second rigid member and the panel member,
the second joining part includes a second joining part crossing part that overlaps with the first joining part and a second joining part adjacent part that is adjacent to the second joining part crossing part and does not overlap with the first joining part,
the second joining part adjacent part includes a non-stacking adjacent part in which the first rigid member is not placed on the one face side of the panel member and a stacking adjacent part in which the first rigid member is placed, and
an adhesive amount per unit area of the adhesive in the stacking adjacent part is smaller than an adhesive amount per unit area of the adhesive in the non-stacking adjacent part.

* * * * *